US009486909B2

(12) United States Patent
Zieger et al.

(10) Patent No.: US 9,486,909 B2
(45) Date of Patent: Nov. 8, 2016

(54) CLAMPING DEVICE FOR A HAND-HELD POWER TOOL

(75) Inventors: Jens Zieger, Altbach (DE); Tobias Lutz, Filderstadt (DE); Szabolcs Gyori, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 319 days.

(21) Appl. No.: 14/118,404

(22) PCT Filed: Dec. 23, 2011

(86) PCT No.: PCT/EP2011/073896

§ 371 (c)(1),
(2), (4) Date: Nov. 18, 2013

(87) PCT Pub. No.: WO2012/167850

PCT Pub. Date: Dec. 13, 2012

(65) Prior Publication Data

US 2014/0084552 A1 Mar. 27, 2014

(30) Foreign Application Priority Data

Jun. 6, 2011 (DE) ........................ 10 2011 076 947
Nov. 2, 2011 (DE) ........................ 10 2011 085 561

(51) Int. Cl.
*B25F 5/00* (2006.01)
*B27B 5/32* (2006.01)
*B24B 23/02* (2006.01)
(Continued)

(52) U.S. Cl.
CPC ............... *B25F 5/00* (2013.01); *B24B 23/022* (2013.01); *B24B 23/04* (2013.01); *B24B 45/006* (2013.01); *B27B 5/32* (2013.01); *Y10T 279/33* (2015.01)

(58) Field of Classification Search
CPC ... B24B 23/022; B24B 23/04; B24B 45/006; B27B 5/32; B27B 19/006; Y10T 279/33
See application file for complete search history.

(56) References Cited

U.S. PATENT DOCUMENTS 4,779,382 A * 10/1988 Rudolf .................. B24B 45/006 451/342
4,989,374 A * 2/1991 Rudolf .................. B24B 23/022 451/342
5,058,909 A * 10/1991 Rudolf .................... B24B 23/02 279/8

(Continued)

FOREIGN PATENT DOCUMENTS

CN 1902029 A 1/2007
CN 1974141 A 6/2007

(Continued)

OTHER PUBLICATIONS

International Search Report corresponding to PCT Application No. PCT/EP2011/073896, mailed May 21, 2012 (German and English language document) (5 pages).

*Primary Examiner* — Eric A Gates
(74) *Attorney, Agent, or Firm* — Maginot, Moore & Beck LLP

(57) ABSTRACT

A clamping device for a hand-held power tool includes at least one clamping unit configured to clamp a processing tool in an axial direction and at least one operating unit configured to actuate the at least one clamping unit. The at least one operating unit has at least one jaw coupling element configured to couple the at least one operating unit to the at least one clamping unit in a rotationally fixed manner. The at least one jaw coupling element is supported so as to be movable at least substantially parallel to the axial direction.

17 Claims, 13 Drawing Sheets

(51) Int. Cl.
*B24B 23/04* (2006.01)
*B24B 45/00* (2006.01)

(56) References Cited

U.S. PATENT DOCUMENTS

| | | | | | |
|---|---|---|---|---|---|
| 5,157,873 | A * | 10/1992 | Rudolf | B24B 23/022 279/904 |
| 5,601,483 | A * | 2/1997 | Rudolf | B24B 23/022 451/342 |
| 6,569,001 | B2 * | 5/2003 | Rudolf | B24B 45/006 451/344 |
| 7,344,435 | B2 * | 3/2008 | Pollak | B24B 45/006 451/342 |
| 7,856,724 | B2 * | 12/2010 | Hartmann | B23Q 11/0092 125/13.01 |
| 8,182,316 | B2 * | 5/2012 | Peisert | B23Q 5/027 30/388 |
| 8,187,058 | B2 * | 5/2012 | Blickle | B24B 23/022 451/342 |
| 8,317,574 | B2 * | 11/2012 | Blickle | B24B 23/02 294/94 |
| 8,960,688 | B2 * | 2/2015 | Zhou | B23D 61/006 279/141 |
| 9,050,663 | B2 * | 6/2015 | Zhou | B23B 31/4073 |
| 9,061,410 | B2 * | 6/2015 | Zhou | B25F 5/00 |
| 9,174,354 | B2 * | 11/2015 | Zhou | B27B 5/32 |
| 2011/0209888 | A1 * | 9/2011 | Elsworthy | B23B 31/1071 173/217 |
| 2013/0180747 | A1 * | 7/2013 | Brown | B25F 5/00 173/145 |
| 2014/0144662 | A1 * | 5/2014 | Zhou | B23Q 3/14 173/213 |
| 2014/0191481 | A1 * | 7/2014 | Kawakami | B23Q 3/14 279/142 |
| 2014/0327215 | A1 * | 11/2014 | Thorson | B23B 31/4073 279/141 |
| 2015/0042052 | A1 * | 2/2015 | Furusawa | B24B 23/04 279/141 |

FOREIGN PATENT DOCUMENTS

| | | | | |
|---|---|---|---|---|
| DE | 10 2007 035 045 | A1 | 1/2009 | |
| EP | 0 133 645 | A2 | 3/1985 | |
| EP | 0 521 259 | A1 | 1/1993 | |
| EP | 0 829 237 | A2 | 3/1998 | |
| EP | 1 180 416 | A2 | 2/2002 | |
| EP | 1 666 754 | A2 | 6/2006 | |
| EP | 2 213 419 | A1 | 8/2010 | |
| EP | 2213416 | A2 * | 8/2010 | B24B 23/00 |

* cited by examiner

CLAMPING DEVICE FOR A HAND-HELD POWER TOOL

This application is a 35 U.S.C. §371 National Stage Application of PCT/EP2011/073896, filed on Dec. 23, 2011, which claims the benefit of priority to Serial No. DE 10 2011 076 947.1, filed on Jun. 6, 2011 in Germany and which claims the benefit of priority to Serial No. DE 10 2011 085 561.0, filed on Nov. 2, 2011 in Germany, the disclosures of which are incorporated herein by reference in their entirety.

BACKGROUND

There are already known hand-held power-tool clamping devices, in particular clamping devices for an oscillating hand-held power tool, which comprise a clamping unit, for securely clamping a working tool in an axial direction, and an operating unit, for actuating the clamping unit.

SUMMARY

The disclosure is based on a hand-held power-tool clamping device, in particular on a clamping device for an oscillating hand-held power tool, comprising at least one clamping unit, for securely clamping a working tool in an axial direction, and comprising at least one operating unit, for actuating the clamping unit.

It is proposed that, for the purpose of coupling the operating unit to the clamping unit in a rotationally fixed manner, the operating unit have at least one claw coupling element, which is mounted so as to be movable at least substantially parallelwise in relation to the axial direction. It is also conceivable, however, for the claw coupling element, for the purpose of coupling in a rotationally fixed manner, to be movable in a movable manner along another direction, considered appropriate by persons skilled in the art. "Provided" is to be understood here to mean, in particular, specially configured and/or specially equipped. A "clamping unit" is to be understood here to mean, in particular, a unit that secures a working tool on a spindle, in particular a spindle driven in an oscillating manner, of a hand-held power tool, in particular along the axial direction, by means of a form-fit and/or by means of a force-fit. The term "axial direction" is intended here to define, in particular, a direction that is preferably at least substantially parallel to a swivel axis and/or rotation axis of the spindle. Particularly preferably, the axial direction is coaxial with the swivel axis of the spindle. "Substantially parallel" is intended here to mean, in particular, an alignment of a direction relative to a reference direction, in particular in one plane, the direction deviating from the reference direction by, in particular, less than 8°, advantageously less than 5°, and particularly advantageously less than 2°.

The term "operating unit" is intended here to define, in particular, a unit having at least one operating element that can be actuated directly by an operator, and which is provided to influence and/or alter a process and/or a state of a unit coupled to the operating element, through an actuation and/or through an input of parameters. "Rotationally fixed" is to be understood to mean, in particular, a connection that transmits a torque and/or a rotational movement at least substantially without change. The term "claw coupling element" is intended here to define, in particular, a movably mounted element provided to generate a form-fitting connection as a result of a movement, to enable forces and/or torques to be transmitted from one component to another component. Preferably, for the purpose of transmitting a torque to the clamping unit, the claw coupling element has at least one axial extension, which is provided to act in combination with a coupling element of the clamping unit in a form-fitting manner, at least in one operating state. The axial extension is preferably disposed on a side of the claw coupling element that faces toward the coupling element, and extends out from the claw coupling element, in the direction of the coupling element. It is also conceivable, however, for the claw coupling element to be of another configuration, considered appropriate by persons skilled in the art, that is suitable for transmitting a torque. Preferably, when the claw coupling element and the coupling element are in a coupled state, the axial extension engages behind a rotary driving extension of the coupling element that corresponds to the axial extension. The axial extension and the rotary driving extension in this case overlap by more than 0.5 mm, preferably by more than 1 mm, and particularly preferably by more than 2 mm, in particular as measured along the axial direction. The expression "overlap" is intended there to define, in particular, an overlap, in particular of partial regions, of at least two components along a direction that is at least substantially perpendicular to the axial direction; in particular a straight line along the direction that is at least substantially perpendicular to the axial direction intersects the two components. The configuration of the hand-held power-tool clamping device according to the disclosure makes it possible, advantageously, to achieve a high degree of operating comfort in operation of the hand-held power-tool clamping device. Moreover, through simple configuration means, the operating unit is easily coupled and/or decoupled.

It is furthermore proposed that the operating unit have at least one cam mechanism for moving the claw coupling element, which cam mechanism has at least one cam element disposed on an operating element of the operating unit. A "cam mechanism" is to be understood here to mean, in particular, a mechanism that, as a result of a movement of the cam element, in particular a rotational movement, and as a result of a geometric shape of the cam element, which acts in combination with a geometric shape of a further cam element, operates a component that executes a movement predefined by the combined action of the geometric shapes. "Disposed on an operating element" is to be understood here to mean, in particular, a connection of the cam element to the operating element such that the cam element can be moved, together with the operating element, relative to a hand-held power-tool housing, the cam element being such that it can be constituted by a component realized separately from the operating element and fastened to the latter, or such that it is integral with the operating element. Preferably, the operating element is realized as an operating lever. It is also conceivable, however, for the operating element to be of another configuration, considered appropriate by persons skilled in the art. Preferably, the cam element comprises at least one cam path, which is disposed on an outer contour of the operating lever and, in particular, is integral with the operating lever. A "cam path" is to be understood here to mean, in particular, a geometric shape specifically provided to move a component by means of a movement along a direction of movement and/or about a movement axis and by means of combined action with a further component. "Integral with" is to be understood to mean, in particular, connected at least in a materially bonded manner, for example by a welding process, an adhesive process, an injection process and/or another process considered appropriate by persons skilled in the art, and/or, advantageously, formed in one piece such as, for example, by being produced from a casting and/or by being produced in a single or multi-component injection process and, advantageously, from a single blank. The configuration of the hand-held power-tool clamping device according to the disclosure makes it possible, advantageously, by means of a movement of the operating element, to generate a positioning force that can act upon the claw coupling element via the cam element.

In an alternative configuration of the hand-held power-tool clamping device, it is proposed that the operating unit have at least one tilt-lever unit for moving the claw coupling element. A "tilt-lever unit" is to be understood here to mean, in particular, a unit that, exploiting the lever principle, converts an effective direction of an operator force, acting upon a tilt-lever element of the unit, into a force acting upon a component along a direction other than the effective direction. Preferably, the tilt-lever unit has at least one tilt-lever element, which has tilt axis, in particular a swivel axis, which, along a longitudinal axis of the tilt-lever element that is at least substantially perpendicular to the tilt-axis, is disposed at a distance relative to two ends of the tilt-lever element that face away from each other. The expression "substantially perpendicular" is intended here to define, in particular, an alignment of a direction relative to a reference direction, the direction and the relative direction, in particular as viewed in one plane, enclosing an angle of 90° and the angle having a maximum deviation of, in particular, less than 8°, advantageously less than 5°, and particularly advantageously less than 2°. Preferably, distances, relative to the tilt axis, of the two ends that face away from each other differ from each other, in particular in respect of a length of a segment along the longitudinal axis of the tilt-lever element of the respective end relative to the tilt axis. The tilt-lever element, therefore, as viewed along the longitudinal axis of the tilt-lever element, preferably has two lever arm regions of differing length. Particularly preferably, one lever arm region of the tilt-lever element is provided to exert an actuating force upon the claw coupling element for the purpose of moving the claw coupling element along the axial direction as a result of an actuation of the tilt-lever element. Advantageously, the tilt-lever element enables a small actuating force by an operator to be converted into a large positioning force for moving the claw coupling element. Advantageously, therefore, the configuration of the hand-held power-tool clamping device according to the disclosure makes it possible to achieve comfortable actuation of the claw coupling element.

It is furthermore proposed that the operating unit comprise at least one operating lever, which constitutes a tilt-lever element of the tilt-lever unit, and which has a swivel axis that is disposed at a distance relative to a rotation axis of the operating element that is at least substantially parallel to the axial direction. The swivel axis of the operating lever is therefore preferably disposed at a distance relative to the rotation axis, along a direction that is at least substantially perpendicular to the rotation axis of the operating element. An "operating lever" is to be understood here to mean, in particular, a rotatably mounted operating element of the operating unit that, perpendicularly in relation to a rotation axis, has at least one lever element, the lever element having a longitudinal extent that is at least twice as great as at least one other extent perpendicularly in relation to a rotation axis. The tilt-lever unit can be realized through simple configuration means, advantageously enabling the claw coupling element to move along the rotation axis of the operating element that is at least substantially parallel to the axial direction.

Advantageously, the tilt-lever unit has at least one operating-lever biasing element, which is provided to exert a biasing force upon the operating lever, in at least one operating position of the operating lever. Preferably, the operating-lever biasing element is realized as a compression spring. It is also conceivable, however, for the operating-lever biasing element to be of another configuration, considered appropriate by persons skilled in the art. The operating-lever biasing element is preferably supported, via one end, on the operating lever, and, via a further end, the operating-lever biasing element is supported on a housing of the operating unit, on which the operating lever is mounted in a swiveling manner. Advantageously, a clamping force can be generated, which is provided to automatically move the operating element into and/or hold the operating element in an operating position.

It is additionally proposed that the claw coupling element be mounted so as to be rotatable relative to an operating lever of the operating unit, being rotatable about a claw rotation axis that at least substantially parallel to the axial direction. In particular, the claw coupling element is mounted so as to be rotatable along an angular range of greater than 20°, preferably greater than 45°, and particularly preferably greater than 60°, relative to the operating lever. Advantageously, it can be ensured that the operating lever is able to move, in particular to rotate about the swivel axis of the operating lever, into a decoupling mode of the operating unit in which at least an axial extension of the claw coupling element and a rotary driving extension of a coupling element of the clamping unit are out of engagement, starting from an attained position of the operating lever after a clamping operation for securely clamping the working tool.

Advantageously, the cam mechanism or the tilt-lever unit has at least one movably mounted, pin-type actuating element, which is provided to actuate the claw coupling element. Preferably, the pin-type actuating element is mounted so as to be translationally movable at least along the axial direction. A "pin-type element" is to be understood here to mean, in particular, an element, in particular a rotationally symmetrical element, that, along a direction that is at least substantially perpendicular to a longitudinal axis of the element, in particular a rotational symmetry axis, has a lesser extent than along an extent that is at least substantially parallel to the longitudinal axis. It is also conceivable, however, for the actuating element to be of another configuration, considered appropriate by persons skilled in the art. Particularly preferably, the actuating element is integral with the operating element of the operating unit, which operating element is realized as an operating lever. It is also conceivable, however, for the actuating element to be connected to the operating element, realized as an operating lever, by means of a form-fitting and/or force-fitting connection. Preferably, the actuating element constitutes a movement axis of the operating element. By simple configuration means, a movement of the cam element can be transmitted to the claw coupling element.

It is additionally proposed that the cam mechanism or the tilt-lever unit have at least one spring element, which exerts a spring force upon the claw coupling element. A "spring element" is to be understood to mean, in particular, a macroscopic element having at least one extent that, in a normal operating state, can be varied elastically by at least 10%, in particular by at least 20%, preferably by at least 30%, and particularly advantageously by at least 50% and that, in particular, generates a counter-force, which is dependent on the variation of the extent and preferably proportional to the variation and which counteracts the variation. An "extent" of an element is to be understood to mean, in particular, a maximum distance of two points of a perpendicular projection of the element on to a plane. A "macroscopic element" is to be understood to mean, in particular, an element having an extent of at least 1 mm, in particular of at least 5 mm, and preferably of at least 10 mm. The spring element is preferably provided to bias the claw coupling element with a spring force along the axial direction. The spring element in this case is preferably realized as a compression spring. It is also conceivable, however, for the spring element to be of another configuration, considered appropriate by persons skilled in the art, such as, for example, configured as a tension spring. Thus, advantageously, secure coupling of the claw coupling element can be achieved.

It is additionally proposed that the clamping unit have at least one clamping element, which has a clamping head disposed eccentrically in relation to a longitudinal axis of the clamping element. The expression "longitudinal axis of the clamping element" is intended here to define, in particular, an axis of the clamping element that, when the clamping element is in the mounted state, is at least substantially parallel to the axial direction and, in particular, at least substantially coaxial with the swivel axis and/or rotation axis of the spindle of the hand-held power tool. A "clamping head" is to be understood here to mean, in particular, a component having at least one clamping face that, for the purpose of securely clamping the working tool in the axial direction, bears at least against a partial surface of the working tool, and that applies a clamping force to the working tool along the axial direction and presses the working tool, in particular, against a tool receiver. A "tool receiver" is to be understood to mean, in particular, a component of a hand-held power tool provided to receive a working tool in a receiving region, and to effect a form-fitting and/or force-fitting connection to the working tool in the circumferential direction. In particular, the tool receiver is connected to the spindle of the hand-held power tool in a form-fitting and/or materially bonded manner. For an operator, advantageously, the working tool can be easily demounted, when the clamping unit is in a non-clamped state.

Preferably, the clamping unit has at least one anti-rotation element, which is provided to secure the clamping element against rotation, at least during a clamping operation and/or a release operation. An "anti-rotation element" is to be understood here to mean, in particular, an element provided to secure the clamping element against rotation relative to a further element, in particular relative to a hand-held power-tool housing of the hand-held power tool and/or relative to the spindle, during action of a torque upon the clamping element. The anti-rotation element is preferably realized as a form-fitting element. It is also conceivable, however, for the anti-rotation element to be realized as a force-fitting element or as another element, considered appropriate by persons skilled in the art. The expression "during a clamping operation and/or a release operation" is to be understood here to mean, in particular, an operation in which a force and/or a torque can act directly and/or indirectly upon the clamping element by means of the operating element, in particular by means of the operating lever, of the operating unit. Preferably, during a clamping operation and/or a release operation, the clamping element is moved by means of a mechanism, in particular a thread, as a result of a torque, along the axial direction, for the purpose of securely clamping the tool. By means of the configuration of the hand-held power-tool clamping device according to the disclosure, it is advantageously possible to prevent accompanying rotation of the clamping element during a clamping operation and/or a release operation.

Advantageously, the clamping unit has at least one overload limiting element, which is provided to interrupt a transmission of torque from the operating unit to the clamping unit if a maximum torque is exceeded. The overload limiting element may be realized electrically, electronically and/or mechanically. It is conceivable in this case for the overload limiting element, for example in the case of a maximum torque being exceeded, to prevent, for example, a rotational movement of the operating element of the operating unit, in particular of the operating lever, for the purpose of generating a torque. Other configurations of the overload limiting element, considered appropriate by persons skilled in the art, are also conceivable. Preferably, the overload limiting element is realized as a mechanical overload limiting element that, owing to a configuration of rotary driving extensions of the overload limiting element, such as, for example, a configuration of rotary driving extensions with ramps, effects decoupling of a driving extension of the claw coupling element, in particular a movement of the claw coupling element along the axial direction, in a direction that faces away from the rotary driving extensions. Advantageously, damage to the clamping element and/or to the working tool during a clamping operation can be prevented.

It is furthermore proposed that the operating unit have at least one operating lever, which is mounted so as to be rotatable about at least one rotation axis that is at least substantially parallel to the axial direction. Particularly preferably, the rotation axis of the operating lever is at least substantially parallel to the axial direction. Advantageously, by means of the operating lever, through use of the lever principle, a high degree of force can be exerted upon the clamping unit. Advantageously, therefore, a high degree of operating comfort can be achieved.

Advantageously, the operating lever is mounted such that it can be swiveled about at least one swivel axis that is at least substantially perpendicular to the axial direction. The operating lever is preferably mounted such that it can be swiveled about the swivel axis along an angular range of less than 360°, in particular less than 270°, and particularly preferably less than 190°. The term "substantially perpendicular" is to be understood here to mean, in particular, an alignment of a direction relative to a reference direction, the direction and the relative direction, in particular as viewed in one plane, enclosing an angle of 90° and the angle having a maximum deviation of, in particular, less than 8°, advantageously less than 5°, and particularly advantageously less than 2°. Advantageously, at least two functions can be integrated into the operating lever.

The disclosure is additionally based on a hand-held power tool, in particular on a hand-held power tool having a spindle that can be driven in an oscillating manner, comprising a hand-held power-tool clamping device according to the disclosure. A "hand-held power tool" is to be understood here to mean, in particular, a portable power tool, for performing work on workpieces, that can be transported by an operator without the use of a transport machine. The hand-held power tool has, in particular, a mass of less than 40 kg, preferably less than 10 kg, and particularly preferably less than 5 kg. Advantageously, for an operator of the hand-held power tool, a high degree of operating comfort can be achieved.

The hand-held power-tool clamping device according to the disclosure and/or the hand-held power tool according to the disclosure is/are not intended to be limited to the application and embodiment described above. In particular, the hand-held power-tool clamping device according to the disclosure and/or the hand-held power tool according to the disclosure, for the purpose of implementing a functioning mode described herein, may have a number of individual elements, components and units that differs from a number stated herein.

BRIEF DESCRIPTION OF THE DRAWINGS

Further advantages are given by the following description of the drawing. The drawing shows exemplary embodiments of the disclosure. The drawing and the description contain numerous features in combination. Persons skilled in the art will also expediently consider the features individually and combine them to create appropriate further combinations.

In the drawing.

DETAILED DESCRIPTION

Figure 1:
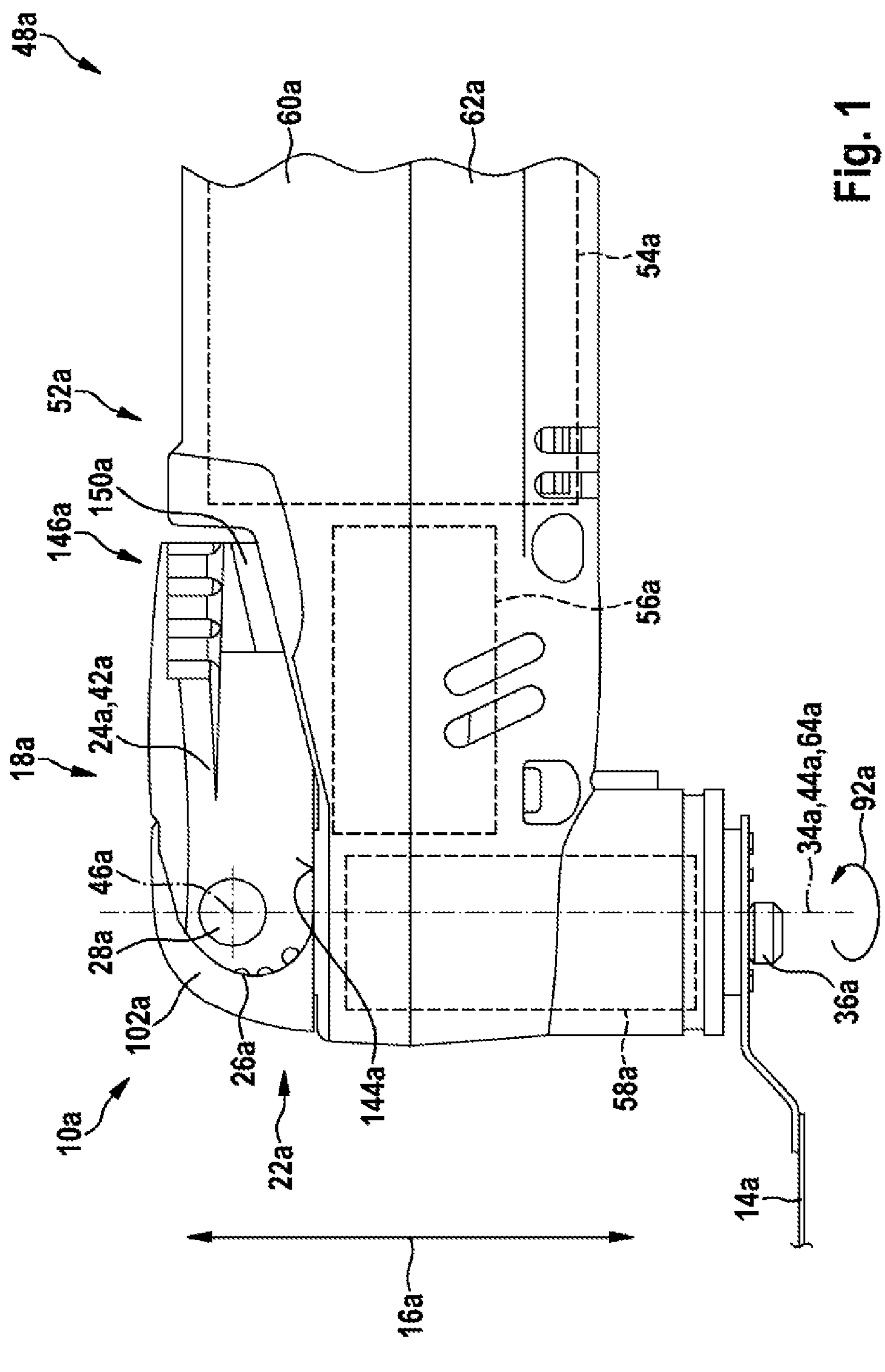
FIG. 1 shows a hand-held power tool according to the disclosure having a hand-held power-tool clamping device according to the disclosure, in a schematic representation.
Figure 2:
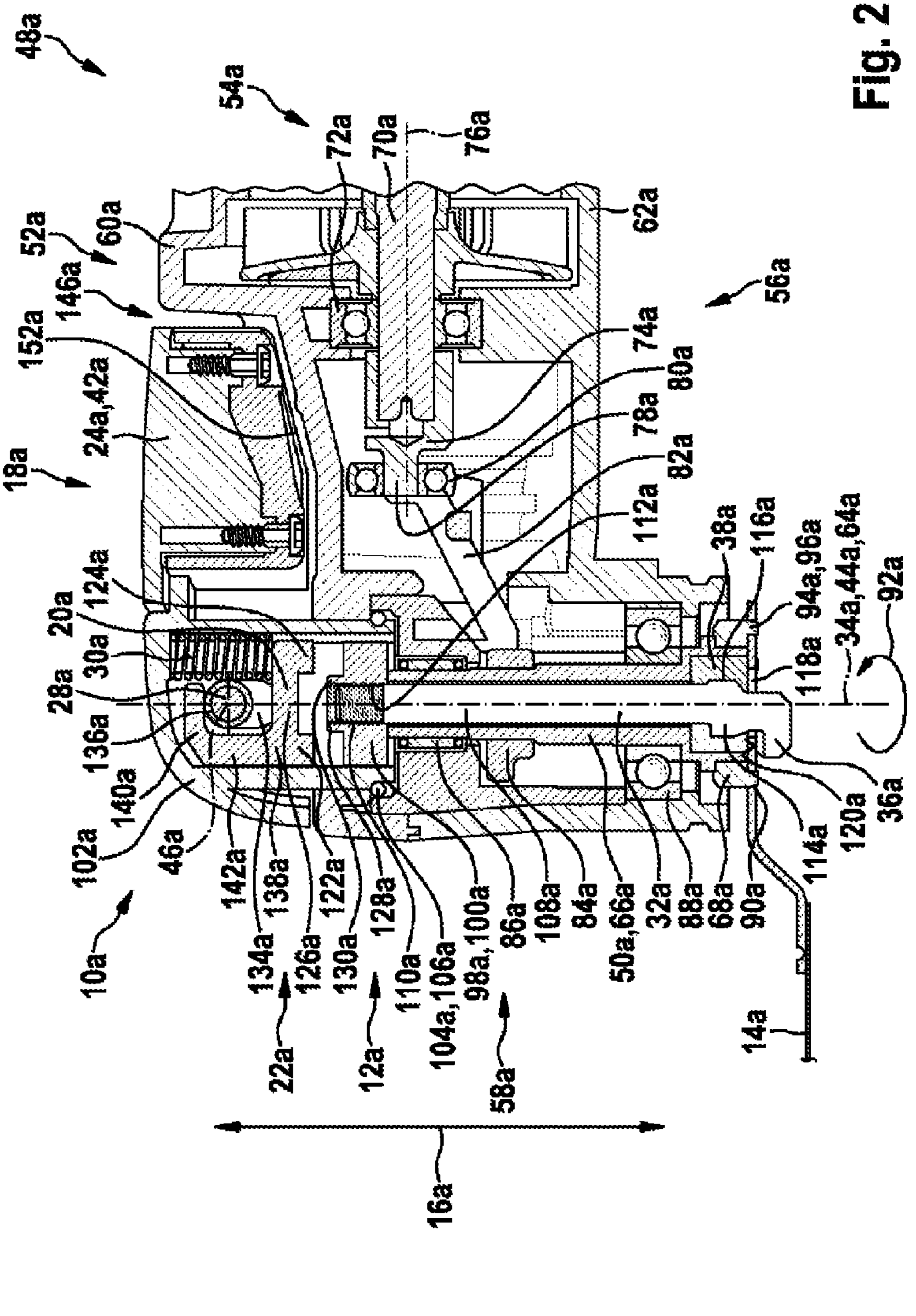
FIG. 2 shows a detail view of an operating unit of the hand-held power-tool clamping device according to the disclosure, with the hand-held power-tool clamping device according to the disclosure decoupled from a clamping unit, in a schematic representation.

FIG. 1 shows a hand-held power tool 48*a*, which can be operated electrically and which has a hand-held power-tool clamping device 10*a*. The hand-held power tool 48*a* comprises a hand-held power-tool housing 52*a*, which encloses an electric motor unit 54*a*, a transmission unit 56*a* and an output unit 58*a* of the hand-held power tool 48*a*. The hand-held power-tool housing 52*a* in this case comprises two housing shells 60*a*, 62*a*, which are separably connected to each other along a plane that is at least substantially perpendicular to an axial direction 16*a*. It is also conceivable, however, for the housing shells 60*a*, 62*a* to be separably connected to each other along another plane, considered appropriate by persons skilled in the art. The axial direction 16*a* is at least substantially parallel to a swivel axis 64*a* of a spindle 50*a* of the output unit 58*a* (FIG. 2), which is realized as a hollow spindle 66*a*. A working tool 14*a*, for performing work on workpieces (not represented in greater detail here), is fastened to a tool receiver 68*a* of the output unit 58*a*. The tool receiver 68*a* is connected to the hollow spindle 66*a* in a rotationally fixed manner by means of a press fit, such that a swivel motion of the hollow spindle 66*a* can be transmitted to the tool receiver 68*a* (FIG. 2). It is also conceivable, however, for the tool receiver 68*a* to be connected to the hollow spindle 66*a* in another manner, considered appropriate by persons skilled in the art.

FIG. 2 shows a sectional view through the hand-held power tool 48*a*. The electric motor unit 54*a* disposed in the hand-held power-tool housing 52*a* comprises a drive shaft 70*a*, which is mounted in the hand-held power-tool housing 52*a* by means of a ball bearing 72*a* of the transmission unit 56*a*. Pressed on to the drive shaft 70*a* is an eccentric sleeve 74*a* of the transmission unit 56*a*, which comprises a journal 78*a* disposed eccentrically in relation to a rotation axis 76*a* of the drive shaft 70*a*. Via a further ball bearing 80*a* of the transmission unit 56*a*, the journal 78*a* is connected to a rocker arm 82*a* of the transmission unit 56*a*, which rocker arm is connected in a rotationally fixed manner to an outer ring of the further ball bearing 80*a*. The rocker arm 84*a*, in turn, is connected to a rocking sleeve 84*a* of the transmission unit 56*a* that is disposed on the hollow spindle 66*a*. Upon a rotation of the drive shaft 70*a*, a combined action of the eccentric sleeve 74, rocker arm 82*a* and rocking sleeve 84*a* generates an oscillating swivel motion of the hollow spindle 66*a* about the swivel axis 64*a*. The spindle 50*a* of the hand-held power tool 48*a*, realized as a hollow spindle 66*a*, can thus be driven in an oscillating manner. By means of the connection of the tool receiver 68*a* and hollow spindle 66*a*, the working tool 14*a* can likewise be driven in an oscillating manner. The hollow spindle 66*a* in this case is mounted in the hand-held power-tool housing 52*a* by a loose bearing, realized as a needle bearing 86*a* of the output unit 58*a*, and by a fixed bearing, realized as a ball bearing 88*a* of the output unit 58*a*.

For the purpose of fastening the working tool 14*a* to the tool receiver 68*a* in a rotationally fixed manner, the working tool 14*a* has driving recesses 90*a*, which are disposed, uniformly distributed in an annulus along a circumferential direction 92*a*, on the working tool 14*a*. The tool receiver 68*a* has lug-type protuberances 94*a*, which correspond to the driving recesses 90*a* and which, when the working tool 14*a* is mounted on the tool receiver 68*a*, extend through the driving recesses 90*a*, along the axial direction 16*a*. The lug-type protuberances 94*a* in this case are realized as latching cams 96*a*. For the purpose of securely clamping the working tool 14*a*, the hand-held power tool 48*a* comprises the hand-held power-tool clamping device 10*a*, which has a clamping unit 12*a* for securely fastening the working tool 14*a* in the axial direction 16*a*, and an operating unit 18*a* for actuating the clamping unit 12*a*. For the purpose of actuating the clamping unit 12*a*, the operating unit 18*a* comprises an operating element 24*a*, which is realized as an operating lever 42*a* and mounted so as to be rotatable about a rotation axis 44*a* that is at least substantially parallel to the axial direction 16*a*. It is also conceivable, however, for the operating element 24*a* to be of another configuration, considered appropriate by persons skilled in the art. The operating lever 42*a* is additionally mounted such that it can be swiveled about a swivel axis 46*a* that is at least substantially perpendicular to the axial direction 16*a*.

The clamping unit 12*a* has a coupling element 98*a*, which is mounted so as to be rotatable about the axial direction 16*a*, and which is realized as a spindle nut 100*a*. The spindle nut 100*a* is rotatably mounted in the hand-held power-tool housing 52*a*, on a side that faces away from the tool receiver 68*a*. In addition, the coupling element 98*a* is secured axially by means of housing stops (not represented in greater detail here), in order to prevent an axial movement. When the operating unit 18*a* is in a mounted state, a housing 102*a* of the operating unit 18*a*, via a partial region of the housing 102 that is in the form of a hollow cylinder, overlaps the coupling element 98*a*. The housing 102*a* of the operating unit 18*a* is rotatably mounted in the hand-held power-tool housing 52*a*. The housing 102*a* in this case is secured axially in the hand-held power-tool housing 52*a* by means of a securing element 104*a* of the hand-held power tool 48*a*. The securing element 104*a* is realized as a circlip 106*a*. By means of a pin-type actuating element 28*a* of a cam mechanism 22*a* of the operating unit 18*a*, the operating lever 42*a* is mounted on the housing 102*a* such that it can be swiveled about the swivel axis 46*a*. The clamping unit 12 additionally comprises a clamping element 32*a*, which has a clamping head 36*a* disposed eccentrically in relation to a longitudinal axis 34*a* of the clamping element 32*a*. On a side that faces toward the tool receiver 68*a*, the clamping head 36*a* comprises a clamping face 120*a*, which is provided to bear against a clamping face of the working tool 14*a*, and thereby securely clamp the working tool 14*a* in the axial direction 16*a* on the tool receiver 68*a*, when the working tool 14*a* is in a mounted and securely clamped state. The clamping element 32*a* additionally has a shaft 108*a*, which extends through the hollow spindle 66*a*, along the axial direction 16*a*, and engages, by an outer thread 110*a* of the shaft 108*a*, in an internal thread 112*a* of the spindle nut 100*a*.

Figure 7:
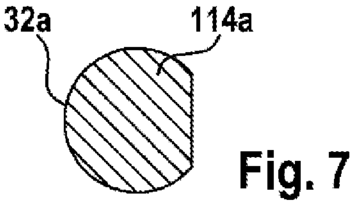
FIG. 7 shows a cross section of a clamping element of the clamping unit, in a region corresponding to an anti-rotation element of the clamping unit, in a schematic representation.

The clamping unit 12*a* additionally has an anti-rotation element 38*a*, which is provided to secure the clamping element 32*a* against rotation during a clamping operation and/or a release operation. The anti-rotation element 38*a* is disposed in a rotationally fixed manner in the hollow spindle 66*a*, on a side that faces away from the operating unit 18*a*. The anti-rotation element 38*a* in this case is disposed in a rotationally fixed manner in the hollow spindle 66*a* by means of a press fit. It is also conceivable, however, for the anti-rotation element 38*a* to be disposed in a rotationally fixed manner in the hollow spindle 66*a* by means of another type of connection, considered appropriate by persons skilled in the art, such as, for example, by means of a form-fitting and/or materially bonded connection. The clamping element 32*a* is disposed, via an anti-rotation region 114*a*, in a recess 116*a* of the anti-rotation element 38*a*. The anti-rotation region 114*a* has a cross section in the form of a circle segment, in a plane that is at least substantially perpendicular to the swivel axis 64*a* of the hollow spindle 66*a* (FIG. 7). It is also conceivable, however, for the anti-rotation region 114*a* to be of another configuration, considered appropriate by persons skilled in the art, such as, for example, configured with a polygonal cross section, etc. The recess 116*a* of the anti-rotation element 38*a* in this case has a configuration corresponding to the cross section of the anti-rotation region 114*a*. The clamping element 32*a* is disposed, so as to be axially movable and secured against rotation, in the anti-rotation element 38*a*. Rotation of the clamping element 32*a* relative to the hollow spindle 66*a* during a clamping operation and/or a release operation is thus prevented by means of the anti-rotation element 38*a*.

Figure 4:
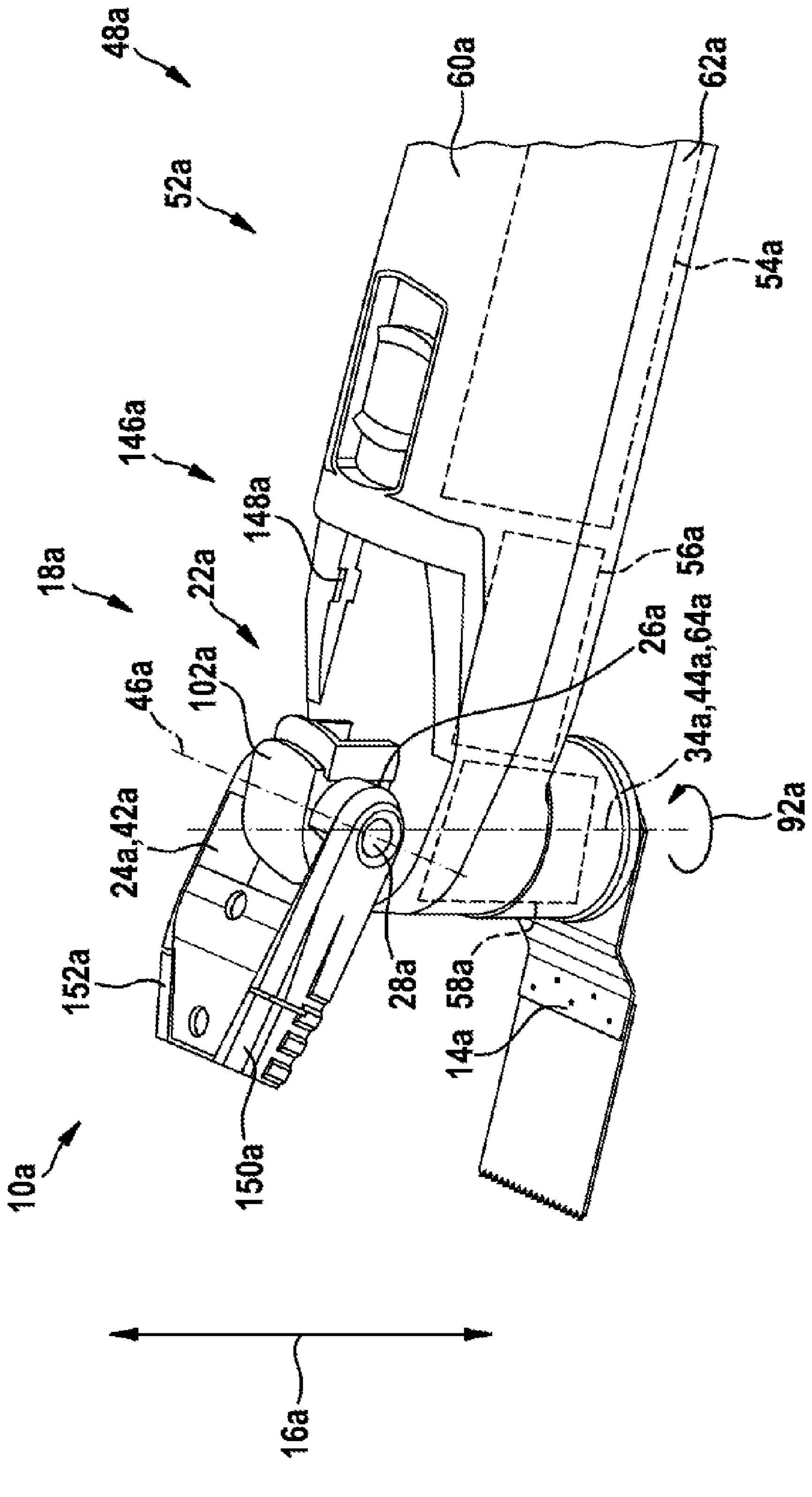
FIG. 4 shows a detail view of the operating unit of the hand-held power-tool clamping device according to the disclosure, with the hand-held power-tool clamping device according to the disclosure coupled to a clamping unit, in a schematic representation.

When the working tool 14*a* is being mounted, the working tool 14*a*, by means of a central receiving opening 118*a*, is pushed axially over the eccentrically disposed clamping head 36*a*. The clamping unit 12*a* in this case is in a release position, in which the clamping head 36*a* is axially spaced apart from the tool receiver 68*a* by more than a thickness of the working tool 14*a* along the axial direction 16*a*. After the working tool 14*a* has been pushed over the clamping head 36*a*, the working tool 14*a* is moved along a direction that is at least substantially perpendicular to the axial direction 16*a*, until the driving recesses 90*a* are in alignment with the latching cams 96*a*. The working tool 14*a* is then moved along the axial direction 16*a*, in the direction of the latching cams 96*a*, until the latching cams 96*a* are disposed in the driving recesses 90*a*. For the purpose of securely clamping the working tool 14*a* on the tool receiver 68*a* in the axial direction 16*a*, an operator can actuate the clamping unit 12*a* by means of the operating lever 42*a*, when in a working position (FIG. 4). The operating unit 18*a* is to actuate the clamping unit 12*a* in a coupling mode, in which forces and/or torques can be transmitted from the operating unit 18*a* to the clamping unit 12*a*. By means of a rotary movement of the operating lever 42*a*, therefore, the clamping element 32*a* can be moved axially, and a clamping force can be generated, which secures the working tool 14*a* axially on the tool receiver 68*a* when the hand-held power tool 48*a* is in operation, such that the working tool 14*a* can be driven in an oscillating manner as a result of the connection to the tool receiver 68*a*. The procedure is in essence reversed for the purpose of unclamping or changing the working tool 14*a*.

Figure 6:
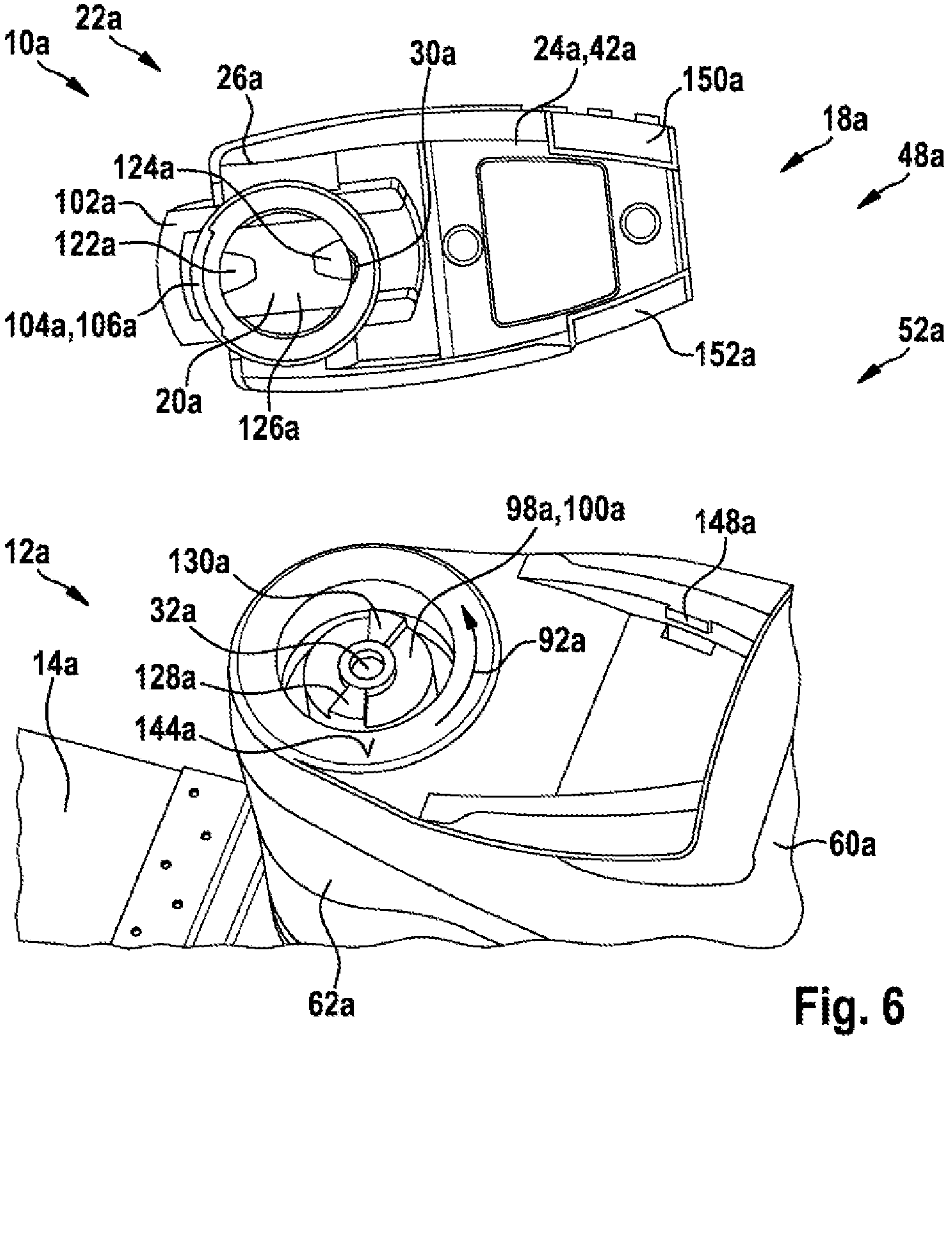
FIG. 6 shows a detail view of a claw coupling element of the operating unit and of a coupling element of the clamping unit that corresponds to the claw coupling element, in a schematic representation.

For the purpose of securely clamping the working tool 14*a*, the operating lever 42*a*, starting from a parked position of the operating lever 42*a* (FIGS. 1 to 3), is swiveled about the swivel axis 46*a*, into the working position. For the purpose of coupling the operating unit 18*a* to the clamping unit 12*a* in a rotationally fixed manner, the operating unit 18*a* has a claw coupling element 20*a*, which is mounted so as to be movable, at least substantially parallelwise in relation to the axial direction 16*a*. The claw coupling element 20*a* is disposed, in the housing 102*a* of the operating unit 18*a*, so as to be axially displaceable along the axial direction 16*a*. In addition, the claw coupling element 20*a* is mounted in a rotationally fixed manner relative to the housing 102. The claw coupling element 20*a* in this case has a main body region 126*a*, which has two sides that are at least substantially parallel to each other, and two arc-shaped sides, which interconnect the sides that are at least substantially parallel to each other. The housing 102*a* has an inner region corresponding to the main body region 126*a*. Alternatively, it would also be conceivable for the housing 102*a*, for the purpose of displaceably mounting the claw coupling element 20*a*, to have on an inner wall, for example, two grooves (not represented in greater detail here), which are offset by 180° relative to each other in the circumferential direction 92*a*, and disposed in which, for example, there is a respective bar-type guide element (not represented in greater detail here) of the claw coupling element 20*a*. It is also conceivable, however, for the housing 102*a* to be of another configuration, considered appropriate by persons skilled in the art, that mounts the claw coupling element 20*a* in a rotationally fixed and axially movable manner in the housing 102*a*. On a side that faces toward the coupling element 98*a*, which is realized as a spindle nut 100*a*, the claw coupling element 20*a* has two axial extensions 122*a*, 124*a* (FIG. 6). The axial extensions 122*a*, 124*a* are formed on to the claw coupling element 20*a*, uniformly distributed along the circumferential direction 92*a*. The axial extensions 122*a*, 124*a* in this case are offset by 180° relative to each other along the circumferential direction 92*a*. It is also conceivable, however, for the axial extensions 122*a*, 124*a* to be fixed to the claw coupling element 20*a* by means of a form-fitting and/or force-fitting connection. Moreover, it is likewise conceivable for the claw coupling element 20*a* to have more or fewer than two axial extensions 122*a*, 124*a*, which are formed on to the claw coupling element 20*a*, in a uniform or non-uniform manner along the circumferential direction 92*a*.

When the operating unit 18*a* is in a coupling mode, the axial extensions 122*a*, 124*a*, for the purpose of transmitting a torque, act in a form-fitting manner in combination with two rotary driving extensions 128*a*, 130*a* of the coupling element 98*a*, realized as a spindle nut 100*a*, of the clamping unit 12*a*. The rotary driving extensions 128*a*, 130*a* are disposed, offset by 180° relative to each other along the circumferential direction 92*a*, on a side of the coupling element 98*a* that faces toward the claw coupling element 20*a*. It is also conceivable, however, for the rotary driving extensions 128*a*, 130*a* to be disposed with another angular distribution on the coupling element 98*a*, considered appropriate by persons skilled in the art. In the coupling mode, the axial extensions 122*a*, 124*a* and the rotary driving extensions 128*a*, 130*a* have, along the circumferential direction 92*a*, a rotation play of less than 15°, in which transmission of torque is prevented in the coupling mode. The rotation play is provided to enable the operating lever 42*a* to be returned to a parked position, separately from a release operation. When the operating unit 18*a* is in a decoupling mode, the claw coupling element 20*a* and the coupling element 98*a* are spaced apart relative to each other along the axial direction 16*a*. This prevents an oscillating motion of the clamping element 32*a*, generated by the electric motor unit 54*a*, from being transmitted to the operating unit 18*a*.

For the purpose of moving the claw coupling element 20*a*, the operating unit 18*a* has a cam mechanism 22*a*, which has a cam element 26*a* disposed on the operating element 24*a*, realized as an operating lever 42*a*, of the operating unit 18*a*. The cam element 26*a* is constituted by two cam paths, which are disposed on an outer contour of the operating lever 42*a*. The cam mechanism 22*a* additionally includes the movably mounted, pin-type actuating element 28*a*, which is provided to actuate the claw coupling element 20*a*. The actuating element 28*a* is disposed in a bearing recess 132*a* of the operating lever 42*a*, eccentrically in relation to the outer contours of the operating lever 42*a* that are realized as cam paths. A longitudinal axis of the actuating element 28*a* constitutes the swivel axis 46*a* of the operating lever 42*a*. The actuating element 28*a* additionally has an insulating sleeve 136*a*, which is provided to electrically insulate the actuating element 28*a* and to reduce a friction during a movement of the actuating element 28*a*. In addition, the actuating element 28*a* is mounted in slot-type recesses 134*a* in the housing 102*a* of the operating unit 18*a*, so as to be movable translationally along the axial direction 16*a*.

Furthermore, the cam mechanism 22*a* has a spring element 30*a*, which exerts a spring force upon the claw coupling element 20*a*. The spring element 30*a* is realized as a compression spring, which applies a spring force to the claw coupling element 20*a* in the direction of the coupling element 98*a* realized as a spindle nut 100*a*. In this case, the spring element 30*a* is supported, via one end, on an inner wall of the housing 102*b* of the operating unit 18*a*. The spring element 30*a* is supported, via a further end, on the main body region 126*a* of the claw coupling element 20*a*. When the operating lever 42*a* is in the parked position, the actuating element 28*a* is disposed in a first end position in the slot-type recesses 134*a*. The actuating element 28*a* in this case bears against a region of the housing 102*a* that delimits the recesses 134*a* on a side that faces away from the coupling element 98*a* of the clamping unit 12*a*. The spring element 30*a* in this case biases the claw coupling element 20*a* in the direction of the coupling element 98*a* of the clamping unit 12*a*. The claw coupling element 20*a* has an L-shaped decoupling extension 138*a*, which comprises a short limb 140*a* and a long limb 142*a*. The short limb 140*a* is at least substantially perpendicular to the axial direction. The long limb 142*a* is at least substantially parallel to the axial direction 16*a*. In the first end position of the actuating element 28*a* that corresponds to the decoupling mode of the operating unit 18*a*, the short limb 140*a* bears against the actuating element 28*a* and/or against the insulating sleeve 136*a* of the actuating element 28*a*, via a side that faces toward the coupling element 98*a* of the clamping unit 12*a*.

When the operating unit 18*a* is being brought from the decoupling mode into the coupling mode, for the purpose of clamping the working tool 14*a* and/or releasing a clamping force for the purpose of changing the working tool 14*a*, an operator swivels the operating lever 42*a*, about the swivel axis 46*a*, starting from the parked position, into the working position of the operating lever 42*a*. In this case, the cam element 26*a* constituted by two cam paths, which, owing to a combined action of the claw coupling element 20*a*, the actuating element 28*a* and the spring element 30*a*, is always subjected to a spring force in the direction of a bearing contact face 144*a* of the hand-held power-tool housing 52*a*, slides on the bearing contact face 144*a*. Owing to the swivel movement of the operating lever 42*a* about the swivel axis 46*a* and the shape of the cam element 26*a*, the actuating element 28*a* is moved, within the slot-type recesses 134*a*, in the direction of the coupling element 98*a* of the clamping unit 12*a*, into a second end position in the slot-type recesses 134*a*. The movement of the actuating element 28*a* in this case is assisted by a combined action of the spring element 30*a* and the claw coupling element 20*a*. Before the working position is attained, therefore, the operating lever 42*a* snaps into the working position as a result of the combined action of the cam element 26*a*, the bearing contact surface 144*a* and the spring element 30*a*. A swivel angle of the operating lever 42*a* into the working position, starting from the parked position, is limited by the actuating element 28*a* bearing against a region of the housing 102*a* that delimits the slot-type recesses 134*a* on a side that faces toward the coupling element 98*a* of the clamping unit 12*a*. During the snap-in operation of the operating lever 42*a*, the claw coupling element 20*a* is moved by the spring element 30*a*, along the axial direction 16*a*, in the direction of the coupling element 98*a* of the clamping unit 12*a*, into the working position, until the claw coupling element 20*a* and the coupling element 98*a* of the clamping unit 12*a* are connected to each other in a form-fitting manner for the purpose of transmitting torques for the purpose of clamping and/or releasing the working tool 14*a*.

Figure 3:
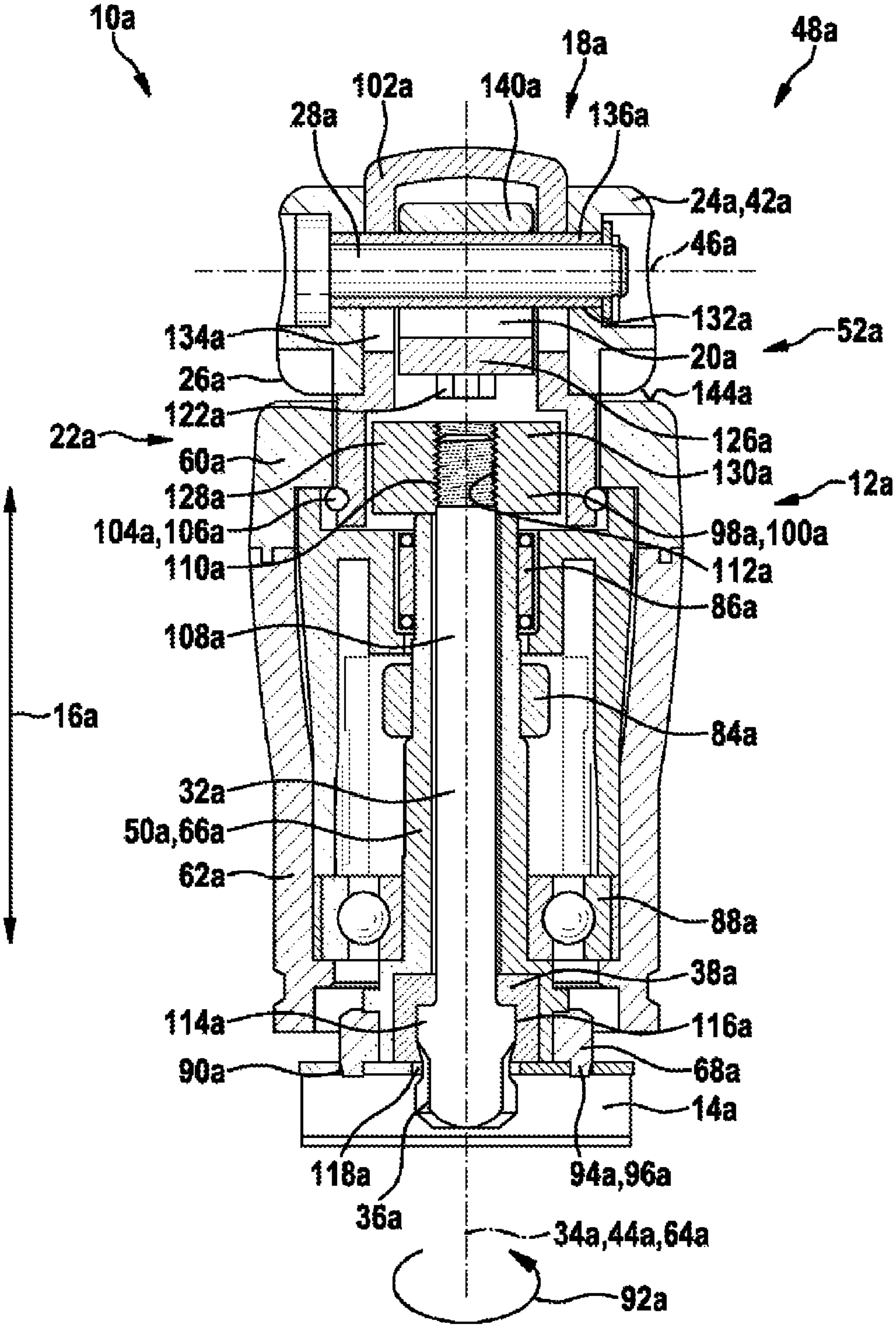
FIG. 3 shows a further detail view of the operating unit of the hand-held power-tool clamping device according to the disclosure, with the hand-held power-tool clamping device according to the disclosure decoupled from a clamping unit, in a schematic representation.
Figure 5:
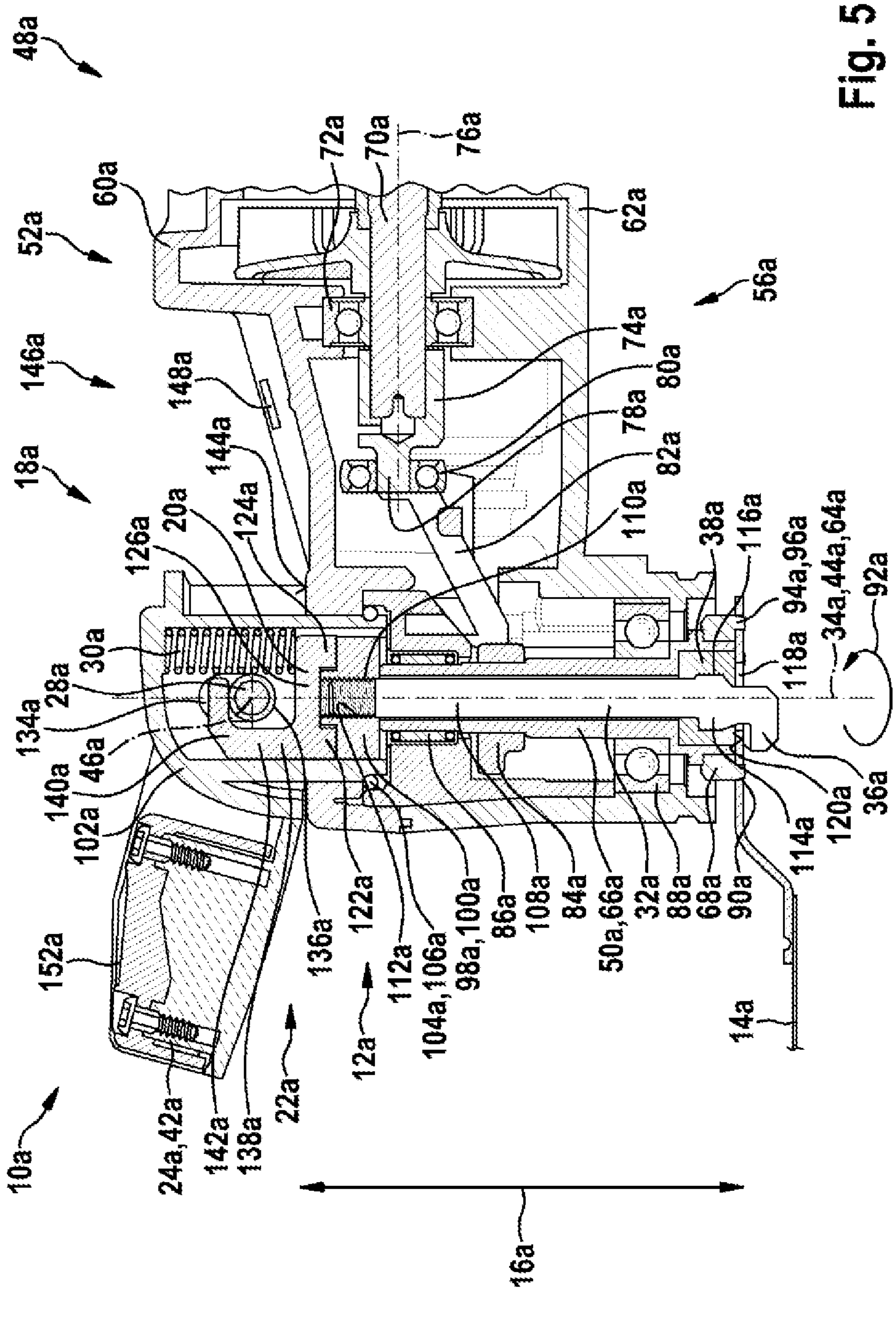
FIG. 5 shows a further detail view of the operating unit of the hand-held power-tool clamping device according to the disclosure, with the hand-held power-tool clamping device according to the disclosure coupled to a clamping unit, in a schematic representation.

Following a clamping operation and/or release operation of the working tool 14*a*, the operating lever 42*a* is swiveled, about the swivel axis 46*a*, starting from the working position, into the parked position. When the operating lever 42*a* is in the parked position, the operating unit 18*a* is in a decoupling mode, such that a rotary driving of the operating lever 42*a* by an oscillating swivel motion of the hollow spindle 66*a* and/or the clamping unit 12*a* is prevented. In the parked position, the hand-held power tool 48*a* can be put into operation. In addition, by means of a latching unit 146*a* of the operating unit 18*a*, the operating lever 42*a*, when in the parked position, is secured against rotation about the rotation axis 44*a* and/or against unintentional swiveling about the swivel axis 46*a* (FIGS. 1 to 3). The latching unit 146*a* has two housing latching elements 148*a* (only one housing latching element 148*a* is represented in FIGS. 4 to 6). The housing latching elements 148*a* are realized as latching projections. Furthermore, the latching unit 146*a* has two operating-lever latching elements 150*a*, 152*a*, which are each realized as a latching projection (FIGS. 4 and 6). The operating-lever latching elements 150*a*, 152*a* are provided to latch into the housing latching elements 148*a* when in the parked position. In addition, the operating-lever latching elements 150*a*, 152*a* are integral with the operating lever 42*a*. For the purpose of releasing a latched connection between the operating-lever latching elements 150*a*, 152*a* and the housing latching elements 148*a*, the operating-lever latching elements 150*a*, 152*a* can be elastically deformed relative to each other, such that the operating-lever latching elements 150*a*, 152*a* become disengaged from the housing latching elements 148*a*. Following the release of the latched connection, the operating lever 42*a* can be rotated about the rotation axis 44*a* and/or swiveled about the swivel axis 46*a*.

For the purpose of indicating an operating mode of the operating unit 18*a*, the hand-held power tool 48*a* can have an operating-mode indication unit (not represented in greater detail here). The operating-mode indication unit can indicate to the operator, by indication means (not represented in greater detail here), the respectively current operating mode of the operating unit 18*a*. The indication means may be constituted by analog indication means such as, for example, a pointer or the like, and/or by electronic indication means such as, for example, LEDs or an LC display. By means of the operating-mode indication unit, incorrect operation can be prevented; in particular, it is possible to prevent the hand-held power tool 48*a* from being put into operation if the operating unit 18*a* is still in a coupling mode, in which the operating lever 42*a* is connected in a rotationally fixed manner to the coupling element 98*a*, realized as a spindle nut 100*a*, via the claw coupling element 20*a*. The operating-mode indication unit in this case can have an electronics unit (not represented here), which is electronically connected to the electric motor unit 54*a*. The electronics unit energizes the electric motor unit 54*a* only if the operating unit 18*a* is in a decoupling mode. As an alternative to the operating-mode indication unit, however, it is also conceivable for the hand-held power tool 48*a* to have a control unit (not represented in greater detail here), which is provided, by means of a mechanical and/or electronic connection to the electric motor unit 54*a*, to prevent the hand-held power tool 48*a* from being put into operation if the operating unit 18*a* is still in a coupling mode, in which the operating lever 42*a* is coupled to the clamping unit 12*a* in a rotationally fixed manner.

FIGS. 8 to 14 shows two alternative exemplary embodiments. Components, features and functions that remain substantially the same are denoted, basically, by the same references. To differentiate the exemplary embodiments, the letters a to c have been appended to the references of the exemplary embodiments. The description that follows is limited substantially to the differences in relation to the first exemplary embodiment, described in FIGS. 1 to 7, and reference may be made to the description of the first exemplary embodiment in FIGS. 1 to 7 in respect of components, features and functions that remain the same.

Figure 8:
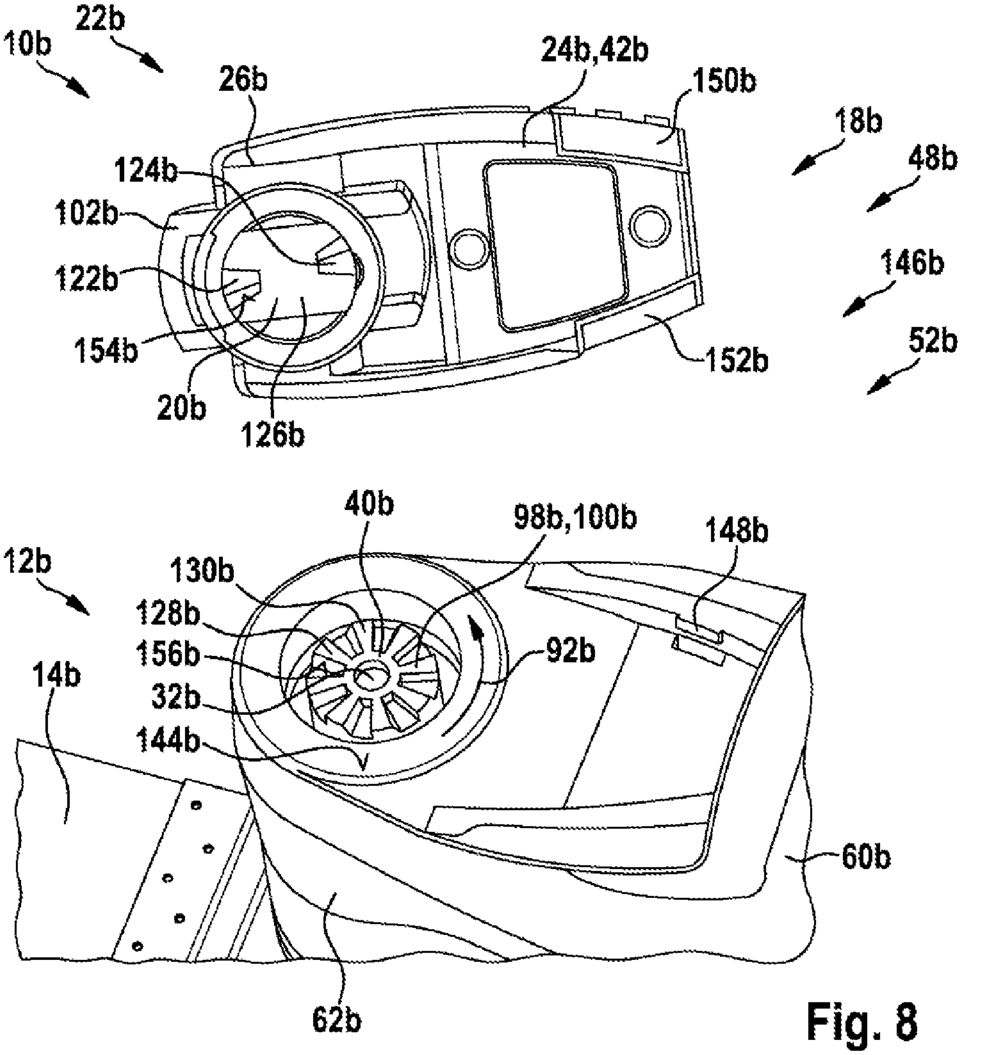
FIG. 8 shows a detail view of an alternative claw coupling element of the operating unit and of an alternative coupling element of the clamping unit that corresponds to the claw coupling element, in a schematic representation

FIG. 8 shows an alternative hand-held power tool 48*b*, having a spindle that can be driven in an oscillating manner (not represented in FIGS. 8 and 9), and an alternative hand-held power-tool clamping device 10*b*. The hand-held power tool 48*b* has a structure similar to that of hand-held power tool 48*a* described in FIGS. 1 to 7. The hand-held power-tool clamping device 10*b* comprises a clamping unit 12*b*, for securely clamping a working tool 14*b* in an axial direction 16*b*, and an operating unit 18*b*, for actuating the clamping unit 12*b*. For the purpose of coupling the operating unit 18*b* to the clamping unit 12*b* in a rotationally fixed manner, the operating unit 18*b* comprises a claw coupling element 20*b*, which is mounted so as to be movable at least substantially parallelwise in relation to the axial direction 16*b*. The operating unit 18*b* additionally has a cam mechanism 22*b* for moving the claw coupling element 20*b*, which has a cam element 26*b* disposed on an operating element 24*b* of the operating unit 18*b*. The clamping unit 12*b* has an overload limiting element 40*b*, which is provided to interrupt a transmission of torque from the operating unit 18*b* to the clamping unit 12*b* if a maximum torque is exceeded. The overload limiting element 40*b* is constituted by a coupling element 98*b* of the clamping unit 12*b*, which coupling element is realized as a spindle nut 100*b*. The overload limiting element 40*b* in this case is disposed on a side of the clamping element 32*b* that faces away from a clamping head (not represented here) of the clamping element 32*b* that is disposed eccentrically in relation to a longitudinal axis 34*b* of the clamping element 32*b*. The clamping head of the clamping element 32*b* is. The overload limiting element 40*b* in this case has a multiplicity of rotary driving extensions 128*b*, 130*b*, distributed in a uniform manner along a circumferential direction 92*b*, disposed on a side that faces toward the claw coupling element 20*b*. The overload limiting element 40*b* has eight rotary driving extensions 128*b*, 130*b* in total. It is also conceivable, however, for the overload limiting element 40*b* to have a number of rotary driving extensions 128*b*, 130*b* that is other than eight. The rotary driving extensions 128*b*, 130*b* are offset by 45° relative to each other along the circumferential direction 92*b*.

Figure 9:
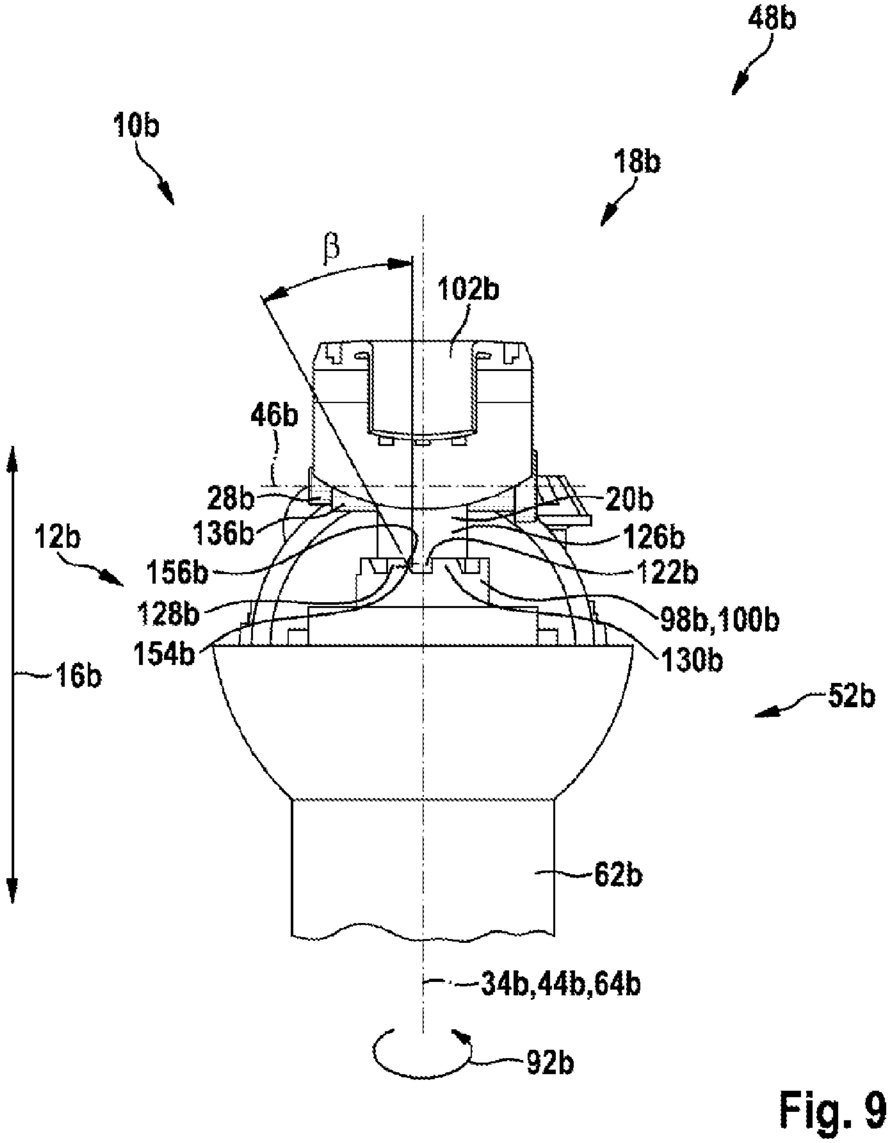
FIG. 9 shows a further detail view of the alternative claw coupling element of the operating unit and of the alternative coupling element of the clamping unit that corresponds to the claw coupling element, in a schematic representation.

For the purpose of transmitting torques from the operating unit 18*b* to the clamping unit 12*b* when the operating unit 18*b* is in a coupling mode, the claw coupling element 20*b* has two axial extensions 122*b*, 124*b* that, in the coupling mode, act in combination with the rotary driving extensions 128*b*, 130*b* in a form-fitting manner (FIG. 9). The axial extensions 122*b*, 124*b* and the rotary driving extensions 128*b*, 130*b* have, respectively, an angled clamping face 154*b*, 156*b*, on a side aligned in the clamping direction. The clamping faces 154*b* of the axial extensions 122*b*, 124*b* each enclose, with a side that faces toward the overload limiting element 40*b*, a pitch angle β that is other than 90°. The clamping faces 156*b* of the rotary driving extensions 128*b*, 130*b* each enclose, with a side that faces toward the claw coupling element 20*b*, a pitch angle β that is other than 90°. The clamping faces 154*b*, 156*b*, together with a straight line that is at least substantially parallel to the axial direction 16*b*, thus enclose the pitch angle β (FIG. 9). The pitch angle β in this case is greater than 15° and less than 90°. In addition, the pitch angle β corresponds to a disengagement torque of 4 to 6 Nm. Therefore, if a torque greater than 4 to 6 Nm is exerted by the claw coupling element 20*b* upon the overload limiting element 40*b*, the clamping faces 154*b* of the axial extensions 122*b*, 124*b* slide on the clamping faces 156*b* of the rotary driving extensions 128*b*, 130*b*. This results in a lifting movement of the claw coupling element 20*b*, contrary to a spring force of a spring element 30*b* of the cam mechanism 22*b*, and consequently in decoupling of the axial extensions 122*b*, 124*b* and the rotary driving extensions 128*b*, 130*b*. Reference may be made to the description of FIGS. 1 to 7 in respect of components, units and a further mode of functioning of the hand-held power-tool clamping device 10*b*.

Figure 10:
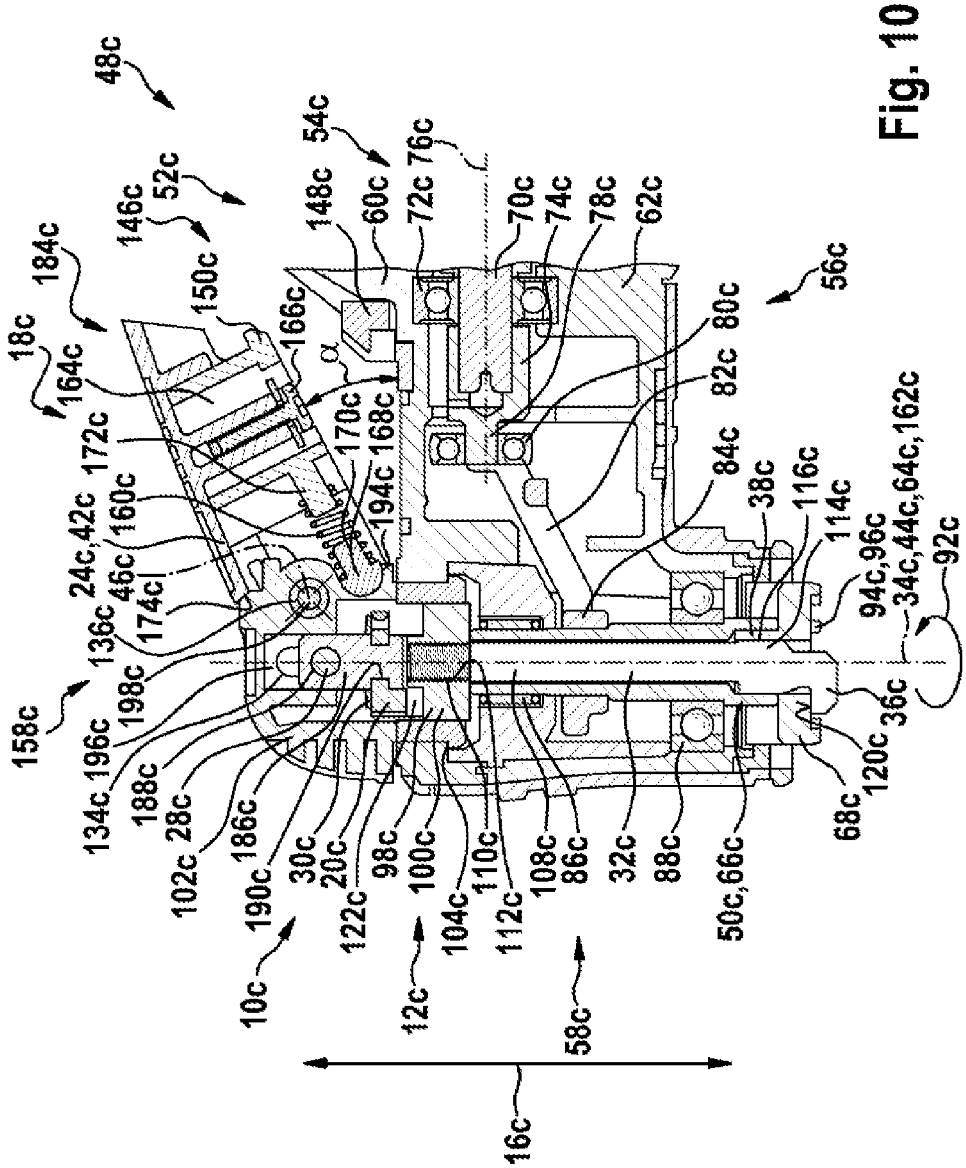
FIG. 10 shows a detail view of an alternative portable power tool according to the disclosure having an alternative hand-held power-tool clamping device according to the disclosure, wherein an operating unit of the hand-held power-tool clamping device according to the disclosure is decoupled from a clamping unit of the hand-held power-tool clamping device according to the disclosure, in a schematic representation.

FIG. 10 shows an alternative hand-held power tool 48*c*, having a spindle 50*c* that can be driven in an oscillating manner, and an alternative hand-held power-tool clamping device 10*c*. The hand-held power tool 48*c* has a structure similar to that of hand-held power tool 48*a* described in FIGS. 1 to 7. The hand-held power-tool clamping device 10*c* comprises a clamping unit 12*c*, for securely clamping a working tool 14*c* (not represented in FIG. 10, cf. FIG. 13) in an axial direction 16*c*, and an operating unit 18*c*, for actuating the clamping unit 12*c*. For the purpose of coupling the operating unit 18*c* to the clamping unit 12*c* in a rotationally fixed manner, the operating unit 18*c* comprises a claw coupling element 20*c*, which is mounted so as to be movable at least substantially parallelwise in relation to the axial direction 16*c*. The operating unit 18*c* in this case comprises at least one tilt-lever unit 158*c* for moving the claw coupling element 20*c*. The operating unit 18*c* additionally comprises at least one operating lever 42*c*, which constitutes a tilt-lever element of the tilt-lever unit 158*c* and which has a swivel axis 46*c* disposed at a distance relative to a rotation axis 44*c* of an operating element 24*c*, which rotation axis is at least substantially parallel to the axial direction 16*c*. Consequently, the operating lever 42*c* is mounted such that it can be rotated about at least the rotation axis 44*c* that is at least substantially parallel to the axial direction 16*c*, and such that it can be swiveled about the swivel axis 46*c* that is at least substantially perpendicular to the axial direction 16*c*. By means of a bearing element 198*c* of the operating unit 18*c*, which is disposed in an insulating sleeve 136*c* of the operating unit 18*c*, the operating lever 42*c* in this case is mounted on a housing 102*c* of the operating unit 18*c* such that it can be swiveled about the swivel axis 46*c*. The operating lever 42*c* is provided to generate torques, by means of a rotary movement of the operating lever 42*c*, for the purpose of securely clamping the working tool 14*c* in the axial direction 16*c*, when the operating unit 18*c* is in a coupling mode, in which the claw coupling element 20*c* is connected in a rotationally fixed manner to a coupling element 98*c* of the clamping unit 12*c*, in a direction of rotation running in a plane that extends at least substantially perpendicularly in relation to the rotation axis 44*c*.

Figure 11:
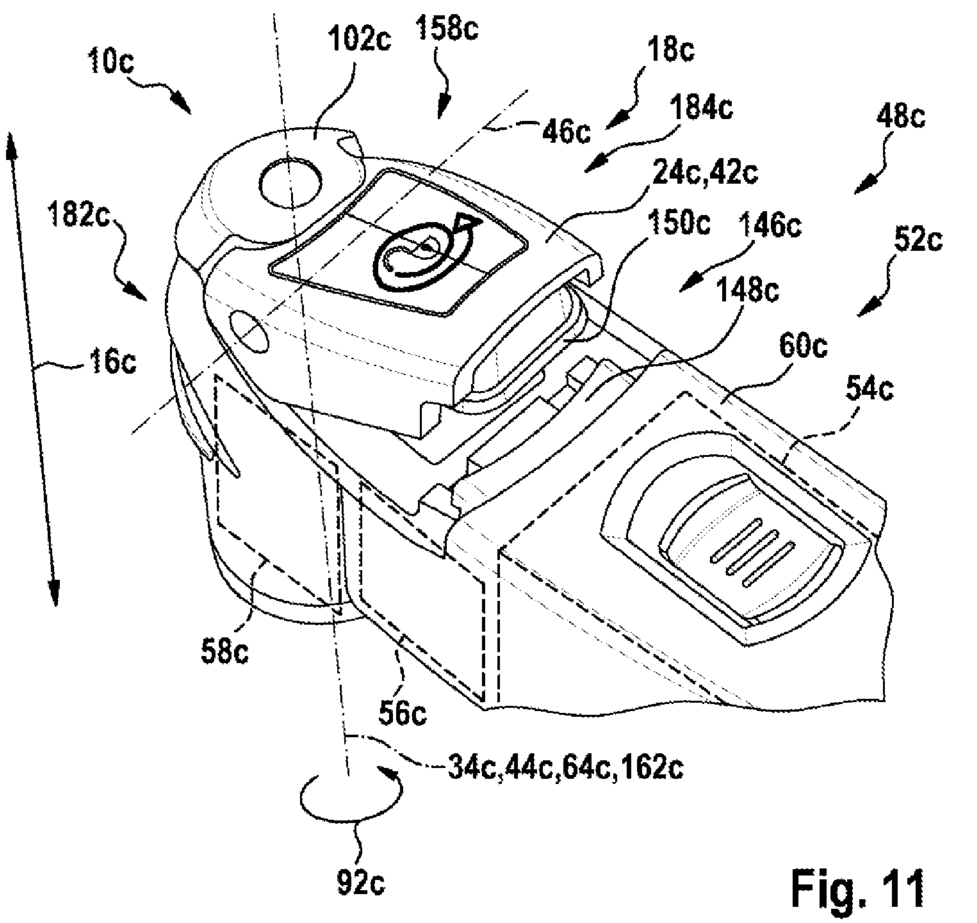
FIG. 11 shows a detail view of a latching unit of the alternative hand-held power-tool clamping device according to the disclosure, in a schematic representation.
Figure 12:
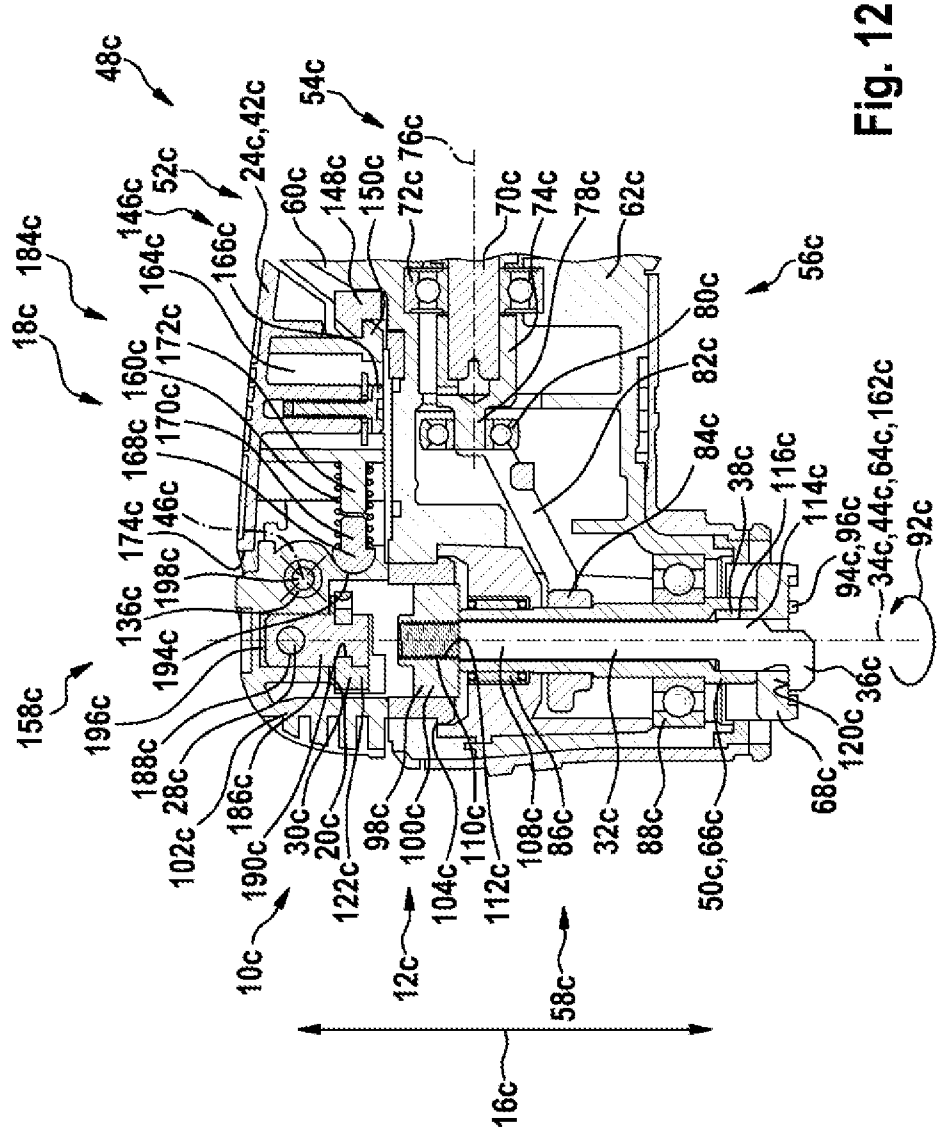
FIG. 12 shows a detail view of the operating unit of the alternative hand-held power-tool clamping device according to the disclosure, when coupled to the clamping unit of the alternative hand-held power-tool clamping device according to the disclosure, in a schematic representation.
Figure 13:
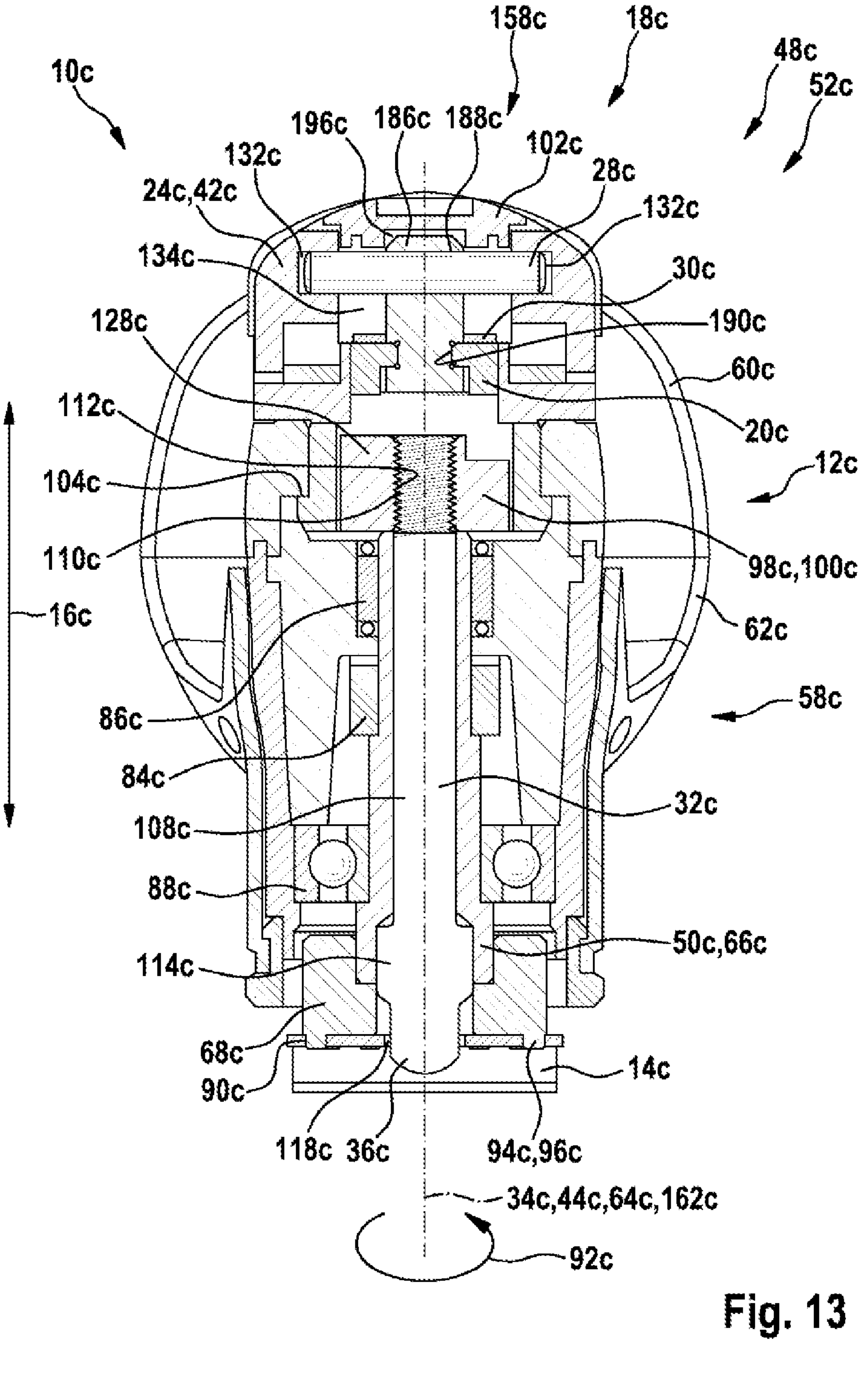
FIG. 13 shows a further detail view of the operating unit of the alternative hand-held power-tool clamping device according to the disclosure, when decoupled from the clamping unit of the alternative hand-held power-tool clamping device according to the disclosure, in a schematic representation.

For the purpose of securely clamping the working tool 14*c* in the axial direction 16*c*, the operating lever 42*c* is rotated, about the rotation axis 44*c*, starting from a parked position of the operating lever 42*c* (FIGS. 12 and 13), into a working position (FIGS. 10 and 11). As a result of this, an operating-lever latching element 150*c* of a latching unit 146*c* of the operating unit 18*c* is disengaged from a housing latching element 148*c* of the latching unit 146*c*. The latching unit 146*c* is provided to secure the operating lever 42*c*, when in the parked position, against being inadvertently swiveled about the swivel axis 46*c*. The housing latching element 148*c* is realized as a latching hook, which has a maximum extent along a direction that is at least substantially perpendicular to the rotation axis 44*c*. The housing latching element 148*c* in this case extends transversely in relation to a longitudinal extent of a hand-held power-tool housing 52*c*. The housing latching element 148*c* in this case is disposed on the hand-held power-tool housing 52*c*. It is also conceivable, however, for the housing latching element 148*c* to be of another configuration, considered appropriate by persons skilled in the art. The operating-lever latching element 150*c* is likewise realized as a latching hook, which has a maximum extent along a direction that is at least substantially parallel to the swivel axis 46*c*. The operating-lever latching element 150*c* in this case is disposed on an operating-lever function element 164*c* that is fixedly connected to the operating lever 42*c*. The operating-lever latching element 150*c* is integral with the operating-lever function element 164*c*. The operating-lever function element 164*c* is fixedly connected to the operating lever 42*c* by means of a screw 166*c* of the operating unit 18*c*. It is also conceivable, however, for the operating-lever function element 164*c* to be connected to the operating lever 42*c* by means of another connection, considered appropriate by persons skilled in the art, such as, for example, by means of a form-fitting and/or materially bonded connection.

Furthermore, the tilt-lever unit 158*c* has at least one operating-lever biasing element 160*c*, which is provided to apply a biasing force to the operating lever 42*c*, in at least one operating position of the operating lever 42*c*. The operating-lever biasing element 160*c* is realized as a compression spring. It is also conceivable, however, for the operating-lever biasing element 160*c* to be of another configuration, considered appropriate by persons skilled in the art. The operating-lever biasing element 160*c* is supported, via one end, on a rotary clamping element 168*c* of the tilt-lever unit 158*c*, and, via a further end, the operating-lever biasing element 160*c* is supported on the operating-lever function element 164*c*. The rotary clamping element 168*c* has a pin-type portion 170*c*, which guides the operating-lever biasing element 160*c*. The operating-lever function element 164*c* likewise has a pin-type portion 172*c*, which guides the operating-lever biasing element 160*c*. The rotary clamping element 168*c* is mounted in a receiving element 194*c* of the housing 102*c* of the operating unit 18*c*, such that it can be swiveled about a swivel axis (not represented in greater detail here), of the rotary clamping element, that is at least substantially parallel to the swivel axis 46*c* of the operating lever 42*c*. The housing 102*c* is mounted in a hand-held power-tool housing 52*c* so as to be rotatable about the rotation axis 44*c*. In addition, the housing 102*c* is secured axially in the hand-held power-tool housing 52*c*, along the axial direction 16*c*.

The operating-lever biasing element 160*c* is provided to automatically swivel the operating lever 42*c* about the swivel axis 46*c*, after it has been rotated, starting from the parked position, into the working position, as a result of a spring force of the operating-lever biasing element 160*c*, realized as a compression spring. This occurs after the operating-lever latching element 150*c* and the housing latching element 148*c* have become disengaged, as a result of the rotary movement of the operating lever 42*c*, starting from the parked position. As a result of a spring force of the operating-lever biasing element 160*c*, therefore, the operating lever 42*c* is swiveled, about the swivel axis 46*c*, relative to the housing 102*c* and relative to the hand-held power-tool housing 52*c*. For the purpose of limiting a swivel angle α relative to the hand-held power-tool housing 52*c*, the operating lever 42*c* has a stop element 174*c*, which acts in combination with the housing 102*c*. Upon attainment of a swivel angle α of approximately 30°, starting from a position of the operating lever 42*c* that corresponds to a position of the operating lever 42*c* in the parked position, relative to the hand-held power-tool housing 52*c*, the stop element 174*c* of the operating lever 42*c* strikes against the housing 102*c*. In this case, however, a maximum swivel angle, by which the operating lever 42*c* can be swiveled, about the swivel axis 46*c*, relative to the housing 102*c* and relative to the hand-held power-tool housing 52*c*, can also be constituted by a value that is considered appropriate by persons skilled in the art, and that is other than 30°.

Figure 14:
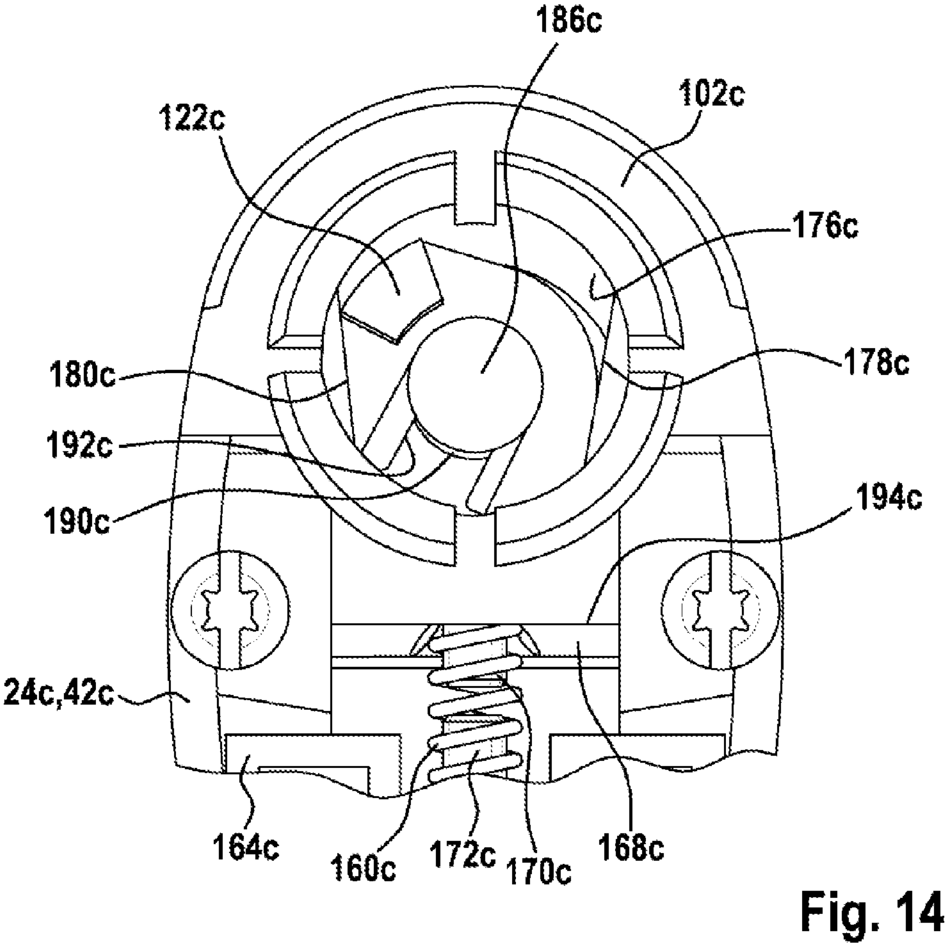
FIG. 14 shows a detail view of a claw coupling element of the alternative hand-held power-tool clamping device according to the disclosure.

As a result of a swivel movement of the operating lever 42*c*, about the swivel axis 46*c*, in a direction that faces away from the hand-held power-tool housing 52*c*, owing to the operating-lever biasing element 160*c*, the claw coupling element 20*c* is moved axially, along the axial direction 16*c*, in the direction of the coupling element 98*c*. The claw coupling element 20*c* in this case is disposed, in the housing 102*c* of the operating unit 18*c*, so as to be displaceable axially, along the axial direction 16*c*. In addition, the claw coupling element 20*c* is mounted so as to be rotatable along an angular range of approximately 90° relative to the housing 102*c* (FIG. 14). The claw coupling element 20*c* therefore has a rotation play relative to the housing 102*c*. The claw coupling element 20*c* in this case is mounted so as to be rotatable relative to an operating lever 42*c* of the operating unit 18*c*, being rotatable about a claw rotation axis 162*c* that at least substantially parallel to the axial direction 16*c*. The claw rotation axis 162*c* is coaxial with the rotation axis 44*c* of the operating lever 42*c*. It is also conceivable, however, for the claw coupling element 20*c* to be mounted so as to be rotatable, relative to the housing 120*c*, along an angular range that is other than 90°. For the purpose of limiting a rotation play of the claw coupling element 20*c* relative to the housing 102*c*, the housing 102*c* has rotary limiting elements 178*c*, 180*c* (FIG. 14), disposed on an inner wall 176*c* of the housing 102*c* that faces toward the claw coupling element 20*c*. The rotary limiting elements 178*c*, 180*c* are provided to limit an angular range along which the claw coupling element 20*c* can be rotated relative to the housing 102*c*. In this case, upon a relative rotation of the claw coupling element 20*c* relative to the housing 102*c*, a side of an axial extension 122*c* of the claw coupling element 20*c* strikes against one of the rotary limiting elements 178*c*, 180*c*, in order to limit the angular range along which the claw coupling element 20*c* can be rotated relative to the housing 102*c*. As a result of the axial extension 122*c* of the claw coupling element 20*c* striking against one of the rotary limiting elements 178*c*, 180*c*, a torque is transmitted to the claw coupling element 20*c* upon a rotary movement of the operating lever 42*c*, or of the housing 102*c*. As a result of this, the claw coupling element 20*c*, together with the operating lever 42*c* and the housing 102*c*, is rotated about the rotation axis 44*c*.

For the purpose of moving the claw coupling element 20*c* along the axial direction 16*c*, a lever arm region 182*c* of the operating lever 42*c*, realized as a tilt-lever element, is connected to the claw coupling element 20*c* via an actuating element 28*c* and an axial movement element 186*c* of the operating unit 18*c*. The lever arm region 182*c*, starting from the swivel axis 46*c*, is disposed on a side of the operating lever 42*c* that faces toward the housing 102*c* (FIG. 11). The operating lever 42*c* has a further lever arm region 184*c*, which, starting from the swivel axis 46*c*, is disposed on a side of the operating lever 42*c* that faces away from the housing 102*c*. The further lever arm region 184*c* is provided to be grasped and/or actuated by an operator in order, for example, to generate a torque for the purpose of securely clamping the working tool 14*c*, etc. The actuating element 28*c* is realized as a pin, which is guided, in a recess 134*c* of the operating lever 42*c*, so as to be movable along the axial direction 16*c*. The axial movement element 186*c* is disposed so as to be axially movable in a guide recess 196*c* of the housing 102*c*. In addition, the actuating element 28*c* is connected to the axial movement element 186*c*, realized as a pin. The actuating element 28*c* in this case is disposed in a recess 188*c* of the axial movement element 186*c*. The axial movement element 186*c* has a full-perimeter receiving groove 190*c*, on a side that faces away from the recess 188*c* for receiving the actuating element 28*c*. The claw coupling element 20*c*, when in a mounted state, is disposed in the receiving groove 190*c*. For the purpose of mounting the claw coupling element 20*c*, the claw coupling element 20*c* in this case has at least one push-on recess 192*c*, by means of which the claw coupling element 20*c* can be pushed on to the axial movement element 186*c*, along a direction that extends at least substantially perpendicularly in relation to a longitudinal extent that, in a mounted state, is at least substantially parallel to the axial direction 16*c* (FIG. 14). An edge region, which delimits the push-on recess 192*c*, and the receiving groove 190*c* together constitute a tongue-and-groove connection. When in a mounted state, therefore, the claw coupling element 20*c* is mounted so as to be rotatable relative to the axial movement element 186*c* and, at the same time, is secured axially on the axial movement element 186*c*.

For the purpose of actuating the clamping unit 12*c*, as a result of a movement of the claw coupling element 20*c* in the axial direction 16*c* and a rotary movement of the claw coupling element 20*c* about the rotation axis 44*c*, the axial extension 122*c* of the claw coupling element 20*c* is connected in a form-fitting manner, in the direction of rotation, to a rotary driving extension 128*c* of the coupling element 98*c*, realized as a spindle nut 100*c* of the clamping unit 12*c*. An operation for clamping the working tool 14*c* is effected in a manner already explained in the description of the exemplary embodiment described in FIGS. 1 to 7. After the clamping operation, the operating lever 42*c* is swiveled about the swivel axis 46*c*, contrary to a spring force of the operating-lever biasing element 160*c*, in the direction of the hand-held power-tool housing 52*c*, relative to the housing 102*c* and the hand-held power-tool housing 52*c*. The claw coupling element 20*c* is thereby decoupled from the coupling element 98*c*. The operating unit 18*c* is in a decoupling mode. The operating lever 42*c* is then swiveled, about the rotation axis 44*c*, into the parked position, until the operating-lever latching element 150*c* and the housing latching element 148*c* are in engagement, and thus secure the operating lever 42*c* in the parked position.

Should the operating lever 42*c*, following a clamping operation, be in a position, relative to the hand-held power-tool housing 52*c*, in which a swivel movement, relative to the hand-held power-tool housing 52*c*, into a position of the operating lever 42*c* that corresponds to a position of the operating lever 42*c* in the parked position, is prevented (FIG. 11), it is possible, because of the rotation play of the claw coupling element 20*c*, to move the operating lever 42*c*, together with the housing 102*c*, relative to the claw coupling element 20*c*, about the rotation axis 44*c*, in which case a rotary movement is effected separately from a release operation of the clamping unit 12*c*. The operating lever 42*c* can therefore out of any position attained after the clamping operation, for the purpose of rotating, about the rotation axis 44*c*, into the parked position, in which the latching unit 146*c* secures the operating lever 42*c* against an unwanted swivel movement about the swivel axis 46*c*.

The invention claimed is:

1. A hand-held power-tool clamping device, comprising:
- at least one clamping unit configured to securely clamp a working tool in an axial direction; and
- at least one operating unit configured to actuate the at least one clamping unit,
- wherein the at least one operating unit has at least one claw coupling element mounted so as to be movable at least substantially parallelwise in relation to the axial direction, the at least one claw coupling element configured at least to couple the at least one operating unit to the at least one clamping unit in a rotationally fixed manner, and
- wherein the at least one operating unit has at least one operating lever mounted so as to be rotatable about at least one rotation axis that is at least substantially parallel to the axial direction.

2. The hand-held power-tool clamping device as claimed in claim 1, wherein:
- the at least one operating unit has at least one cam mechanism configured to move the at least one claw coupling element, and
- the at least one cam mechanism has at least one cam element disposed on an operating element of the at least one operating unit.

3. The hand-held power-tool clamping device as claimed in claim 2, wherein the at least one cam mechanism has at least one movably mounted, pin-type actuating element configured to actuate the at least one claw coupling element.

4. The hand-held power-tool clamping device as claimed in claim 2, wherein the at least one cam mechanism has at least one spring element configured to exert a spring force upon the at least one claw coupling element.

5. The hand-held power-tool clamping device as claimed in claim 1,
- wherein the at least one operating unit has at least one tilt-lever unit configured to move the at least one claw coupling element.

6. The hand-held power-tool clamping device as claimed in claim 5, wherein:
- the at least one operating unit includes at least one operating lever configured to constitute a tilt-lever element of the at least one tilt-lever unit, and
- the at least one operating lever is swivelable about a swivel axis that does not intersect the at least one rotation axis.

7. The hand-held power-tool clamping device as claimed in claim 6, wherein the at least one tilt-lever unit has at least one operating-lever biasing element configured to exert a biasing force upon the at least one operating lever in at least one operating position of the at least one operating lever.

8. The hand-held power-tool clamping device as claimed in claim 5, wherein:
- the at least one claw coupling element is mounted so as to be rotatable relative to an operating lever of the at least one operating unit, and
- the at least one claw coupling element is configured to be rotatable about a claw rotation axis that is at least substantially parallel to the axial direction.

9. The hand-held power tool clamping device as claimed in claim 5, wherein the at least one tilt-lever unit has at least one movably mounted, pin-type actuating element configured to actuate the at least one claw coupling element.

10. The hand-held power tool clamping device as claimed in claim 5, wherein the at least one tilt-lever unit has at least one spring element configured to exert a spring force upon the at least one claw coupling element.

11. The hand-held power-tool clamping device as claimed in claim 1, wherein the at least one clamping unit has at least one clamping element, including a clamping head disposed eccentrically in relation to a longitudinal axis of the at least one clamping element.

12. The hand-held power-tool clamping device as claimed in claim 11,
- wherein the at least one clamping unit has at least one anti-rotation element configured to secure the at least one clamping element against rotation, at least during at least one of a clamping operation and a release operation.

13. The hand-held power-tool clamping device as claimed in claim 1, wherein the at least one clamping unit has at least one overload limiting element configured to interrupt a transmission of torque from the at least one operating unit to the at least one clamping unit if a maximum torque is exceeded.

14. The hand-held power-tool clamping device as claimed in claim 1, wherein the at least one operating lever is mounted so as to be swiveled about at least one swivel axis that is at least substantially perpendicular to the axial direction.

15. The hand-held power-tool clamping device as claimed in claim 1, wherein the clamping device is a clamping device for an oscillating hand-held power tool.

16. A hand-held power tool, comprising:
- a hand-held power-tool clamping device, including:
  - at least one clamping unit configured to securely clamp a working tool in an axial direction; and
  - at least one operating unit configured to actuate the at least one clamping unit,
  - wherein the at least one operating unit has at least one claw coupling element mounted so as to be movable at least substantially parallelwise in relation to the axial direction, the at least one claw coupling element configured at least to couple the at least one operating unit to the at least one clamping unit in a rotationally fixed manner, and
  - wherein the at least one operating unit has at least one operating lever mounted so as to be rotatable about at least one rotation axis that is at least substantially parallel to the axial direction.

17. The hand-held power tool as claimed in claim 16, wherein the hand-held power tool is a hand-held power tool having a spindle that can be driven in an oscillating manner.

* * * * *